United States Patent
Jonietz

(10) Patent No.: US 12,299,080 B2
(45) Date of Patent: May 13, 2025

(54) METHOD, APPARATUS, AND SYSTEM FOR TRAFFIC ESTIMATION BASED ON ANOMALY DETECTION

(71) Applicant: HERE Global B.V., Eindhoven (NL)

(72) Inventor: David Jonietz, Zürich (CH)

(73) Assignee: HERE GLOBAL B.V., Eindhoven (NL)

( * ) Notice: Subject to any disclaimer, the term of this patent is extended or adjusted under 35 U.S.C. 154(b) by 681 days.

(21) Appl. No.: 17/410,698

(22) Filed: Aug. 24, 2021

(65) Prior Publication Data

US 2023/0066501 A1 Mar. 2, 2023

(51) Int. Cl.
| | |
|---|---|
| G06F 18/2413 | (2023.01) |
| G06F 18/22 | (2023.01) |
| G06N 20/00 | (2019.01) |
| G08G 1/01 | (2006.01) |
| G01S 19/14 | (2010.01) |
| G06F 16/2455 | (2019.01) |

(52) U.S. Cl.
CPC .......... *G06F 18/2413* (2023.01); *G06F 18/22* (2023.01); *G06N 20/00* (2019.01); *G08G 1/01* (2013.01); *G01S 19/14* (2013.01); *G06F 16/2455* (2019.01)

(58) Field of Classification Search
CPC . G06N 20/00; G06F 16/2455; G06F 18/2413; G06F 18/22; G08G 1/01
See application file for complete search history.

(56) References Cited

U.S. PATENT DOCUMENTS

| | | | | |
|---|---|---|---|---|
| 2018/0335307 | A1* | 11/2018 | Chen | G01C 21/3815 |
| 2019/0120964 | A1* | 4/2019 | Luo | G01S 7/4817 |
| 2020/0228880 | A1* | 7/2020 | Iyer | H04N 21/251 |

OTHER PUBLICATIONS

Kuang et al., "Detecting Traffic Anomalies in Urban Areas Using Taxi GPS Data", Research Article, Mathematical Problems in Engineering, vol. 2015, Article ID 809582, 13 pages.

Huang et al., Abstract of "Cognitive Traffic Anomaly Prediction from GPS Trajectories Using Visible Outlier Indexes and Meshed Spatiotemporal Neighborhoods" Cognitive Computation 12, Published: Jul. 29, 2020, 1 page.

(Continued)

*Primary Examiner* — Andrea C Leggett

(57) ABSTRACT

An approach is provided for traffic estimation/detection based on anomaly detection. The approach involves, for instance, retrieving probe data or other sensor data collected from sensors of devices traveling in a geographic area. The approach also involves aggregating the probe or sensor data into a sequence of frames. Each frame comprises a plurality of spatial cells representing the geographic area at a respective time interval. The approach further involves computing a similarity of the sequence to one or more historical sequences comprising historical frames of spatially and temporally binned historical probe data. The approach further involves determining a classification of a traffic state associated with the probe or sensor data as either a normal traffic state or as a traffic anomaly based on the similarity. By way of example, the traffic state of the probe data can then be estimated/predicted based on the classification.

20 Claims, 14 Drawing Sheets

(56) References Cited

OTHER PUBLICATIONS

Yu et al., "Spatiotemporal Recurrent Convolutional Networks for Traffic Prediction in Transportation Networks", Article, Sensors 27(17):1501, Jun. 2017, pp. 1-16.

Yu et al., "Deep Learning: A Generic Approach for Extreme Condition Traffic Forecasting", Proceedings of the 2017 SIAM International Conference on Data Mining (SDM), 9 pages.

Loumiotis et al., "Road Traffic Prediction Using Artificial Neural Networks", Conference Paper, Sep. 2018, 5 pages.

Wang et al., "Efficient Metropolitan Traffic Prediction Based on Graph Recurrent Neural Network", Nov. 2, 2018, 3 pages.

Shen et al., "StepDeep: A Novel Spatial-temporal Mobility Event Prediction Framework based on Deep Neural Network Share on", Research-Article, KDD '18: Proceedings of the 24th ACM SIGKDD International Conference on Knowledge Discovery & Data Mining, Jul. 19, 2018, pp. 724-733.

"Manhattan-taxi-trajectories dataset", retrieved on Aug. 19, 2021 from https://www.cs.cornell.edu/~arb/data/Manhattan-taxi-trajectories/, 1 page.

* cited by examiner

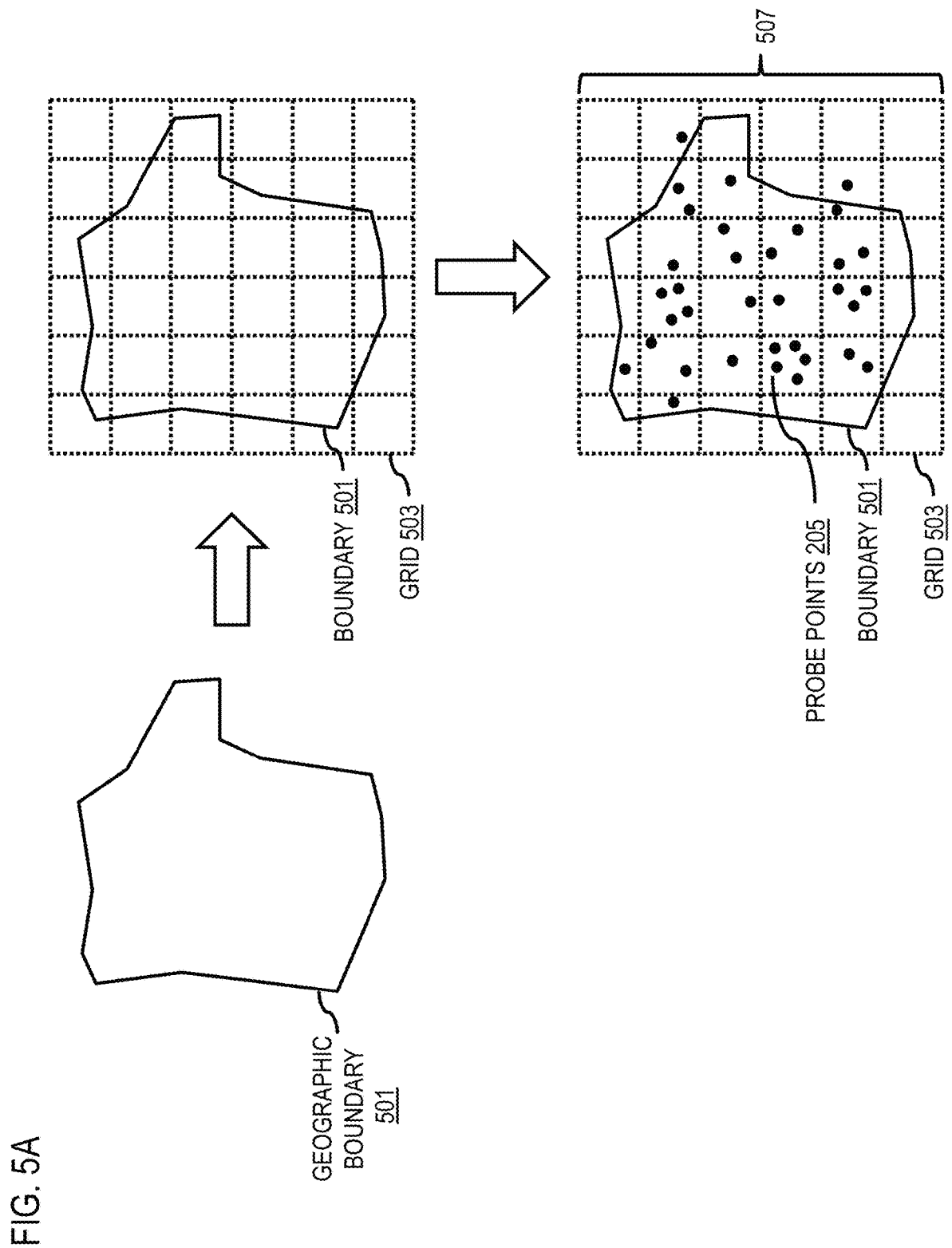

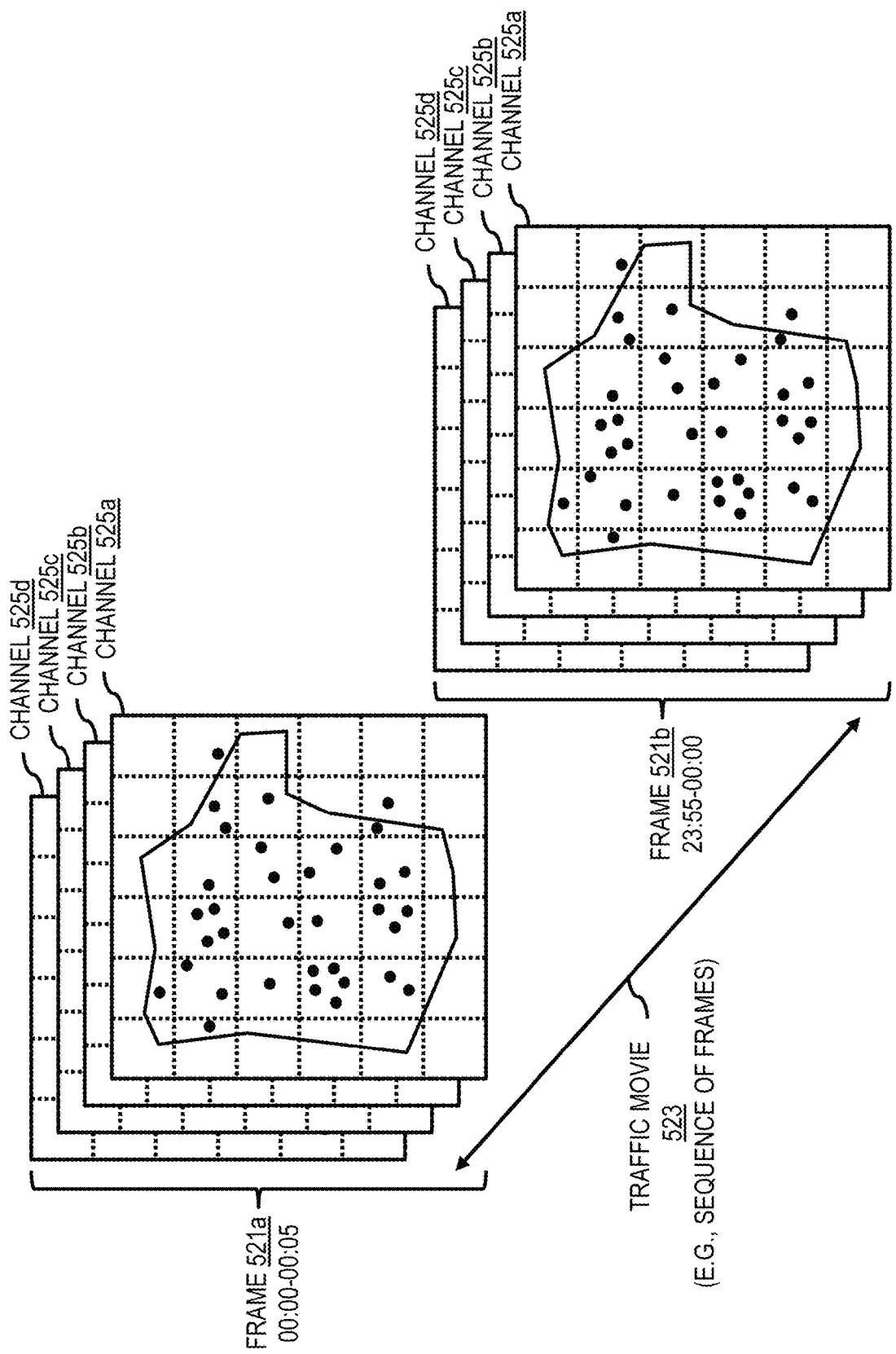

METHOD, APPARATUS, AND SYSTEM FOR TRAFFIC ESTIMATION BASED ON ANOMALY DETECTION

BACKGROUND

Mapping and navigation service providers are increasingly using machine learning models for traffic estimation and prediction based on sensor data (e.g., probe data indicating the locations and/or trajectories of probe devices operating in the field). However, using probe data or other sensor data for traffic estimation typically requires heavy data pre-processing pipelines (e.g., to map match probe data to digital map data) to put the probe in a form amenable to traffic estimation. As a result, service providers face significant technical challenges with respect to reducing the pre-processing requirements to improve automated traffic estimation/prediction performance.

SOME EXAMPLE EMBODIMENTS

Therefore, there is a need for reducing the data pre-processing pipeline used for traffic estimation and prediction.

According to one embodiment, a method comprises retrieving probe data or other sensor data collected from one or more sensors of one or more devices traveling in a geographic area. The method also comprises aggregating the probe data or other sensor data into a sequence of one or more frames. Each frame of the sequence comprises a plurality of spatial cells representing the geographic area at a respective time interval, and the probe data or other sensor data is spatially and temporally binned into the plurality of spatial cells. The method further comprises computing a similarity of the sequence to one or more historical sequences comprising one or more historical frames of spatially and temporally binned historical probe data. The one or more historical sequences, for instance, are linked with respective historical traffic states. The method further comprises determining a classification of a traffic state associated with the probe data or sensor data as either a normal traffic state or as a traffic anomaly based on the similarity. The method further comprises providing the classification of the traffic state as an output. In one embodiment, the output enables determining the traffic estimation/prediction process to apply for the probe data or other sensor data. For example, based on determining that the classification is the normal traffic state, the method further comprises computing the traffic state of the sequence based on the respective historical states. Otherwise, based on determining that the classification is the traffic anomaly, the method comprises processing the probe data or other sensor data using a data processing pipeline to compute the traffic state of the sequence.

According to another embodiment, an apparatus comprises at least one processor, and at least one memory including computer program code for one or more computer programs, the at least one memory and the computer program code configured to, with the at least one processor, cause, at least in part, the apparatus to retrieve probe data or other sensor data collected from one or more sensors of one or more devices traveling in a geographic area. The apparatus is also caused to aggregate the probe data or other sensor data into a sequence of one or more frames. Each frame of the sequence comprises a plurality of spatial cells representing the geographic area at a respective time interval, and the probe data or other sensor data is spatially and temporally binned into the plurality of spatial cells. The apparatus is further caused to compute a similarity of the sequence to one or more historical sequences comprising one or more historical frames of spatially and temporally binned historical probe data. The one or more historical sequences, for instance, are linked with respective historical traffic states. The apparatus is further caused to determine a classification of a traffic state associated with the probe data or sensor data as either a normal traffic state or as a traffic anomaly based on the similarity. The apparatus is further caused to provide the classification of the traffic state as an output. In one embodiment, the output enables determining the traffic estimation/prediction process to apply for the probe data or other sensor data. For example, based on determining that the classification is the normal traffic state, the apparatus is further caused to compute the traffic state of the sequence based on the respective historical states. Otherwise, based on determining that the classification is the traffic anomaly, the apparatus is further caused to process the probe data or other sensor data using a data processing pipeline to compute the traffic state of the sequence.

According to another embodiment, a non-transitory computer-readable storage medium carries one or more sequences of one or more instructions which, when executed by one or more processors, cause, at least in part, an apparatus to retrieve probe data or other sensor data collected from one or more sensors of one or more devices traveling in a geographic area. The apparatus is also caused to aggregate the probe data or other sensor data into a sequence of one or more frames. Each frame of the sequence comprises a plurality of spatial cells representing the geographic area at a respective time interval, and the probe data or other sensor data is spatially and temporally binned into the plurality of spatial cells. The apparatus is further caused to compute a similarity of the sequence to one or more historical sequences comprising one or more historical frames of spatially and temporally binned historical probe data. The one or more historical sequences, for instance, are linked with respective historical traffic states. The apparatus is further caused to determine a classification of a traffic state associated with the probe data or sensor data as either a normal traffic state or as a traffic anomaly based on the similarity. The apparatus is further caused to provide the classification of the traffic state as an output. In one embodiment, the output enables determining the traffic estimation/prediction process to apply for the probe data or other sensor data. For example, based on determining that the classification is the normal traffic state, the apparatus is further caused to compute the traffic state of the sequence based on the respective historical states. Otherwise, based on determining that the classification is the traffic anomaly, the apparatus is further caused to process the probe data or other sensor data using a data processing pipeline to compute the traffic state of the sequence.

According to another embodiment, an apparatus comprises means for retrieving probe data or other sensor data collected from one or more sensors of one or more devices traveling in a geographic area. The apparatus also comprises means for aggregating the probe data or other sensor data into a sequence of one or more frames. Each frame of the sequence comprises a plurality of spatial cells representing the geographic area at a respective time interval, and the probe data or other sensor data is spatially and temporally binned into the plurality of spatial cells. The apparatus further comprises means for computing a similarity of the sequence to one or more historical sequences comprising one or more historical frames of spatially and temporally binned historical probe data. The one or more historical sequences, for instance, are linked with respective historical traffic states. The apparatus further comprises means for determining a classification of a traffic state associated with the probe data or sensor data as either a normal traffic state or as a traffic anomaly based on the similarity. The apparatus further comprises means for providing the classification of the traffic state as an output. In one embodiment, the output enables determining the traffic estimation/prediction process to apply for the probe data or other sensor data. For example, based on determining that the classification is the normal traffic state, the apparatus further comprises means for computing the traffic state of the sequence based on the respective historical states. Otherwise, based on determining that the classification is the traffic anomaly, the apparatus further comprises means for processing the probe data or other sensor data using a data processing pipeline to compute the traffic state of the sequence.

According to one embodiment, a method comprises retrieving historical probe data or other sensor data collected from one or more sensors of one or more devices previously traveling in a geographic area. The method also comprises aggregating the historical probe data or other sensor data into one or more historical sequences of one or more historical frames. Each historical frame of the one or more historical sequences comprises a plurality of spatial cells representing the geographic area at a respective time interval, and the probe data is spatially and temporally binned into the plurality of spatial cells. The method further comprises generating a linking of the one or more historical sequences to one or more respective historical traffic states. The method further comprises storing the association in a database. In one embodiment, the database enables determining a traffic state classification of an observed sequence of one or more other frames aggregated from other probe data.

According to another embodiment, an apparatus comprises at least one processor, and at least one memory including computer program code for one or more computer programs, the at least one memory and the computer program code configured to, with the at least one processor, cause, at least in part, the apparatus to retrieve historical probe data or other sensor data collected from one or more sensors of one or more devices previously traveling in a geographic area. The apparatus is also caused to aggregate the historical probe data or other sensor data into one or more historical sequences of one or more historical frames. Each historical frame of the one or more historical sequences comprises a plurality of spatial cells representing the geographic area at a respective time interval, and the probe data is spatially and temporally binned into the plurality of spatial cells. The apparatus is further caused to generate a linking of the one or more historical sequences to one or more respective historical traffic states. The apparatus is further caused to store the association in a database. In one embodiment, the database enables determining a traffic state classification of an observed sequence of one or more other frames aggregated from other probe data.

According to another embodiment, a non-transitory computer-readable storage medium carries one or more sequences of one or more instructions which, when executed by one or more processors, cause, at least in part, an apparatus to retrieve historical probe data or other sensor data collected from one or more sensors of one or more devices previously traveling in a geographic area. The apparatus is also caused to aggregate the historical probe data or other sensor data into one or more historical sequences of one or more historical frames. Each historical frame of the one or more historical sequences comprises a plurality of spatial cells representing the geographic area at a respective time interval, and the probe data is spatially and temporally binned into the plurality of spatial cells. The apparatus is further caused to generate a linking of the one or more historical sequences to one or more respective historical traffic states. The apparatus is further caused to store the association in a database. In one embodiment, the database enables determining a traffic state classification of an observed sequence of one or more other frames aggregated from other probe data.

According to another embodiment, an apparatus comprises means for retrieving historical probe data or other sensor data collected from one or more sensors of one or more devices previously traveling in a geographic area. The apparatus also comprises means for aggregating the historical probe data or other sensor data into one or more historical sequences of one or more historical frames. Each historical frame of the one or more historical sequences comprises a plurality of spatial cells representing the geographic area at a respective time interval, and the probe data is spatially and temporally binned into the plurality of spatial cells. The apparatus further comprises means for generating a linking of the one or more historical sequences to one or more respective historical traffic states. The apparatus further comprises means for storing the association in a database. In one embodiment, the database enables determining a traffic state classification of an observed sequence of one or more other frames aggregated from other probe data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, at least one service configured to perform any one method/process, or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A and 5B are diagrams illustrating examples of encoding probe or sensor data into a sequence of frames (e.g., a traffic movie) for end-to-end traffic estimation, according to an example embodiment;

DESCRIPTION OF SOME EMBODIMENTS

Examples of a method, apparatus, and computer program for traffic estimation based on anomaly detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
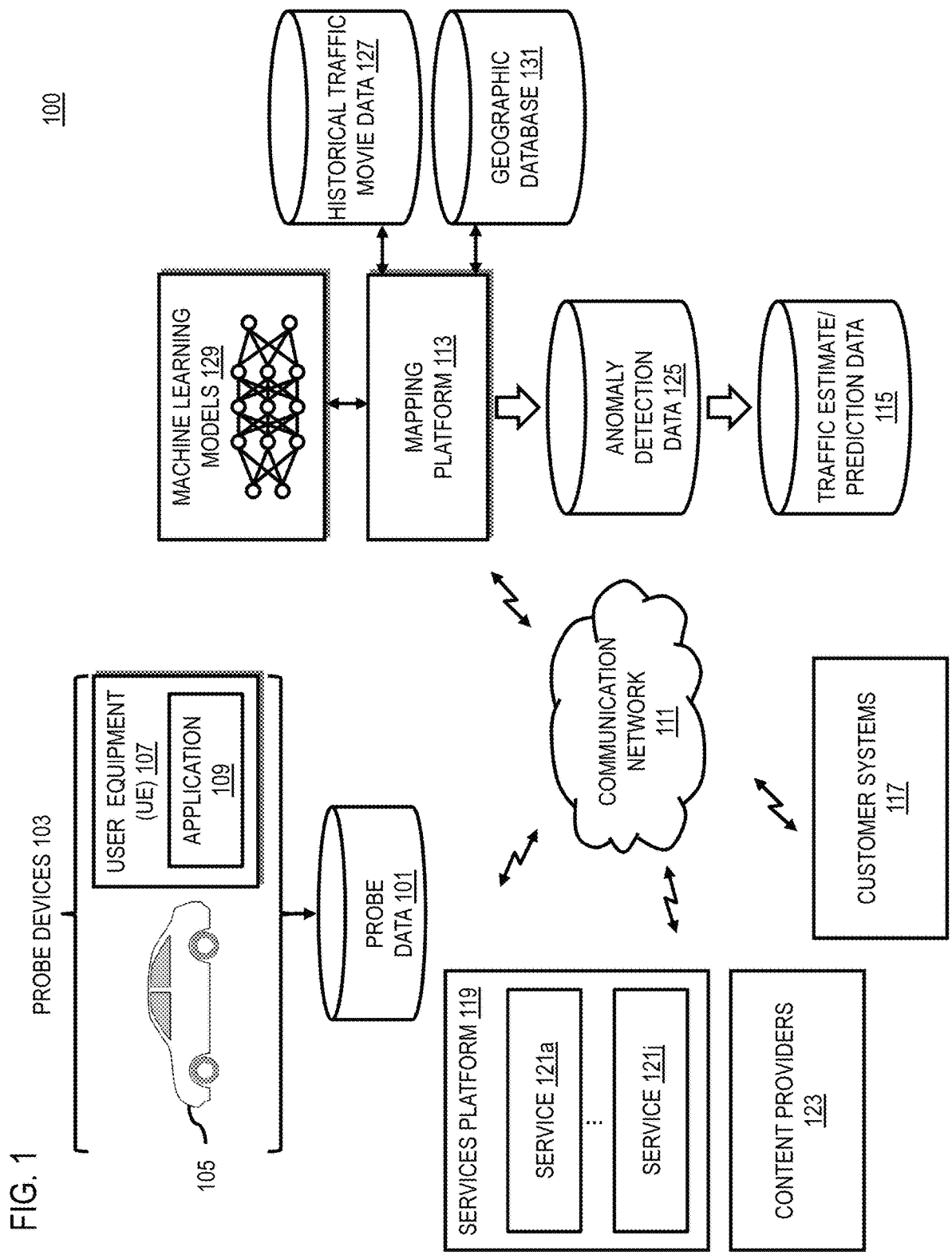
FIG. 1 is a diagram of a system capable of traffic estimation based on anomaly detection, according to an example embodiment.

FIG. 1 is a diagram of a system 100 capable of traffic estimation based on anomaly detection, according to an example embodiment. The various embodiments described herein relate to the following areas:

(1) Traffic estimation and prediction from probe data 101: In one embodiment, a fleet of probe devices 103 [e.g., (1) vehicles 105 such as taxi cabs, Original Equipment Manufacturer (OEM) fleets, and/or the like; and (2) user equipment (UE) devices 107 executing location-based applications 109 such as smartphones, portable navigation systems, and/or the like] are equipped with positioning devices or sensors (e.g., Global Position System (GPS) or equivalent) which constantly record their positions, heading direction and current speed at various time intervals (e.g., every 5 seconds). The resulting probe data 101 consists of probe points wherein each probe point may be a tuple (e.g., a tuple of location <latitude—lat, longitude—lon> and heading/speed <time—t, speed—s, heading—h>) indicating that a vehicle 105 or device 107 is at location (lat, lon) at time t moving with speed s and heading direction h. At fixed time intervals, the recorded probe data 101 is streamed over a communication network 111 to a central server (e.g., a mapping platform 113), which on this basis, estimates the past, current, and/or future traffic states (e.g., (e.g., traffic estimate/prediction data 115). By way of example, the traffic state can be represented as average traffic flow volume per road segment, average traffic speed per road segment, and/or any other equivalent traffic parameter per road segment. In one embodiment, this information is then provided as a service (e.g., for routing in navigation devices, etc.) to customers (e.g., customer systems 117 and/or other customer devices such as vehicles 105 and UEs 107). These services, for instance, can be provided by the mapping platform 113 itself or by any other service or application such as, but not limited, to a services platform 119, one or more services 121a-121j of the services platform 119, content providers 123, application 109, and/or the like).

(2) Traffic anomaly detection: The volume and speed of traffic (e.g., particularly urban traffic) generally follows regular recurring patterns, e.g., based on the time of day (e.g., morning and afternoon rush hour) and the day of the week (e.g., weekday vs. weekends). As used herein, anomalies are rare events, and occur when at a certain location, the volume and/or speed differ significantly from their expected "normal" state, for instance, due to accidents, large-scale events, construction sites, etc. For accurate and reliable traffic estimation and prediction, detecting these anomalous events (e.g., anomaly detection data 125) in the incoming probe data 101 and predicting their future impact on traffic flow represents a significant technical challenge for service providers.

(3) Content based image retrieval: This term describes a type of pattern retrieval, where the task is to identify the k most similar images in a database (e.g., a historical traffic movie database 127 comprising image-based representation of historical probe data), given a query image (e.g., an image created from current probe data 101). By way of example, k is a user-set parameter, e.g., k=3, meaning that in this example, for each content based image retrieval query, 3 images (e.g., k images) are returned as results. In one embodiment, to reduce computational cost for searching large image databases, rather than the original images, compressed but semantically meaningful feature representations can be used. For example, machine learning models 129 such as, but not limited to, neural networks or other equivalent machine learning algorithms, are widely used for classification and regression tasks and have become popular tools for this purpose. In particular, deep neural networks, i.e., those with comprise multiple hidden layers, have become popular tools for computer vision applications, which may comprise predicting plausible next frames in a video or translating images or videos to other forms of representation such as textual descriptions of its contents.

The various embodiments described herein combine the above two areas to provide for innovative traffic estimation and prediction. Traffic estimation and prediction—i.e., inferring the current and predicting the future state of one or more traffic variables (e.g., the average speed) on the segments of a road network—are central to various applications related, for instance, to Intelligent Transport Systems (ITS) and Advanced Traveler Information Systems (ATIS). Probe data 101 (e.g., GPS-based probe data) has developed into a primary source for these purposes, however, typically require heavy processing pipelines including filtering, map matching (e.g., to road segments stored in a geographic database 131), and many more steps (see discussion of conventional processing pipeline discussed below with respect to FIG. 2) until the desired end product, e.g., average speed per road segment or other traffic estimation, can be inferred. To achieve high quality results, each of these processing steps usually requires complex computations. Furthermore, probe data 101 is usually of large volume, e.g., with billions of probe points entering the system per day. On the other hand, since traffic is highly dynamic with road conditions changing constantly, it is critical to process the data quickly and provide traffic estimations and predictions on a high temporal resolution (e.g., minutely). In practice, this conflict is often resolved by resorting to simpler methods for processing the probe data 101, thereby trading lower quality than could be achieved with state-of-the-art probe processing algorithms for feasible computational cost and run time.

The dynamics of traffic, however, mainly follow a regular pattern, i.e., the speed and/or volume in a road network will likely evolve in the same way as in similar situations in the past. This makes traffic estimation and prediction particularly promising applications for pattern retrieval methods, where "similar" traffic situations can be identified and retrieved from a database of historical traffic data (e.g., historical traffic movie data 127), given current traffic data (e.g., currently collected probe data 101). One possible way is to extract the "typical" speed and/or volume on the same weekday and same time of day—techniques subsumed under the term Historical Traffic Patterns (HSP)—which usually leads to already quite accurate estimations of their current and future states. Alternatively, it would be desirable to explicitly query a historical database for similar samples, without simply assuming similarity based on the correspondence of the time of day and day of the week. While these and similar pattern retrieval methods often provide sufficiently accurate estimations and are very cheap to compute, they suffer from two main technical problems which the various embodiments described herein are aiming to address:

Identifying similar traffic state samples from a historical database based on a query sample requires estimating the query state from the raw probe data, and therefore involves similar heavy preprocessing as described with respect to FIG. 2 below. The main advantage of pattern retrieval methods being computationally cheap is thus lost. In cases, where HSP-type methods retrieve, for instance, just the HSP for the current time of day and day of the then they would without estimating the query state from the raw probe data, then they are likely to fail at detecting traffic anomalies that do not occur on a regular basis as discussed in the bullet point below.

All pattern retrieval methods fail in the presence of rare events, i.e., anomalous traffic states (e.g., spontaneous congestions due to accidents, construction sites or large-scale events). Since in such anomalous situations, traffic differs significantly from regular patterns, they could only be detected from estimating the current traffic state from the most recent probe data directly, which again requires complex preprocessing compared to simple pattern retrieval.

To address the first of the problems mentioned above, the various embodiments of the system 100 described herein introduce a capability to apply a cheap spatio-temporal aggregation step to incoming probe data 101 to convert it to an image-type data format (e.g., "traffic movie" generation). The resulting query image (e.g., one or more frames of the traffic movie) can then be compared against a database (e.g., historical traffic movie data 127) of historical value images and their corresponding future, current, and/or past traffic states (e.g., the average speed or volume per road segment) by, for instance, calculating a similarity measure and retrieving the k most similar samples. Thus, pattern retrieval is possible without using a heavy preprocessing pipeline to compute traffic state (e.g., traffic estimate/prediction data 115) from the raw probe points (e.g., probe data 101).

In one embodiment, the second problem is addressed by interpreting the similarity measure calculated in the pattern retrieval step as a measure of anomaly of the current traffic situation. Thus, for instance, if the maximum similarity value which a query image achieves with regards to all historical samples (e.g., samples of the historical traffic movie data 127) is significantly below a certain threshold, this could indicate that a rare event (e.g., a traffic anomaly) is currently occurring. In this case, the various embodiments of the system 100 could switch from using a cheap pattern retrieval to using a more complex algorithm for traffic state estimation and prediction, such as a traditional probe data processing pipeline (e.g., as described in FIG. 2).

Thus, in one embodiment, the system 100 would aim at using more costly traffic estimation and prediction algorithms only in cases when they are really needed (e.g., only when a traffic anomaly is detected), while falling back to cheaper pattern retrieval methods in all other cases (e.g., when a "normal" traffic state is detected such as when an aggregated image-like representation (e.g., one or more frames of a traffic movie) the observed probe data 101 is within a similarity threshold of one or more frames of historical traffic movie data 127).

In one embodiment, to implement the approach described above, the system 100 of FIG. 1 can train a machine learning model 129 (e.g., a Neural Network or equivalent) to directly map from only minimally preprocessed probe data 101 to predicted traffic data 115 (e.g., past, current, and/or future speed values on the segments of a road network represented in the geographic database 131). This allows for the use of computationally complex processing pipelines only for (1) (offline) training data generation while during the (online) production mode only one forward pass through the trained machine learning model 129 is needed to produce traffic estimation and prediction data 115; and/or (2) when estimating/predicting traffic states for probe data 101 that have been classified as traffic anomalies according to the various embodiments described herein.

In comparison to conventional approaches in which traffic anomalies are detected based on deviations in these origin-destination matrices, the various embodiments described herein differ in at least the following ways:

The various embodiments of system 100 described herein aggregate the speed/volume of all probe points per spatial/temporal unit, regardless of the start and end points of their respective trajectories. This is much cheaper to compute, since no map matching and trajectory generation from the raw probe points is necessary, and the system 100 works in real-time.

The various embodiments of system 100 described herein use the computed similarity value (e.g., similarity between a frame of observed/current probe data 101 to frames of historical traffic movie data 127) for two purposes simultaneously, anomaly detection and similar pattern retrieval.

The various embodiments of system 100 described herein use the result of the anomaly detection procedure to dynamically choose the most appropriate traffic estimation and prediction method for the current traffic situation.

In comparison to conventional grid-based approached that aggregate speed values from GPS trajectories, the various embodiments described herein differ in at least the following ways:

Rather than using map matched trajectories, the various embodiments of system 100 described herein aggregate the probe points of the probe data 101 directly without map-matching to avoid this computationally heavy preprocessing step.

As discussed above, the various embodiments of system 100 described herein use the computed similarity value for two purposes simultaneously, anomaly detection and similar pattern retrieval.

Again as discussed above, the various embodiments of system 100 described herein use the result of the anomaly detection procedure to dynamically choose the most appropriate traffic estimation and prediction method for the current traffic situation.

In summary, the various embodiments of the system 100 described herein provided for several technical advantages including but not limited to:

Enables extracting similar traffic patterns from historical database, regardless of the temporal correspondence of time of day and day of the week (this represents an extension to HSP methods);

Avoids heavy preprocessing for traffic pattern retrieval method, but instead uses easy to compute traffic movies;

Detects anomalies and in this case dynamically switches to a more appropriate complex traffic estimation and prediction method;

Is highly modular and allows for various methods to be used in all steps including similarity assessment, anomaly detection, pattern retrieval and traffic estimation and prediction;

In one embodiment, uses summary statistics in place of raw probe data 101 by spatially and/or temporally aggregating the raw probe data 101 as a vector of descriptive statistics (e.g., minimum, maximum, mean, standard deviation, etc.) summarizing probe feature values or characteristics (e.g., speed, heading, count, etc.); and Works for large-scale (e.g., city-wide) traffic estimations and predictions.

Figure 2:
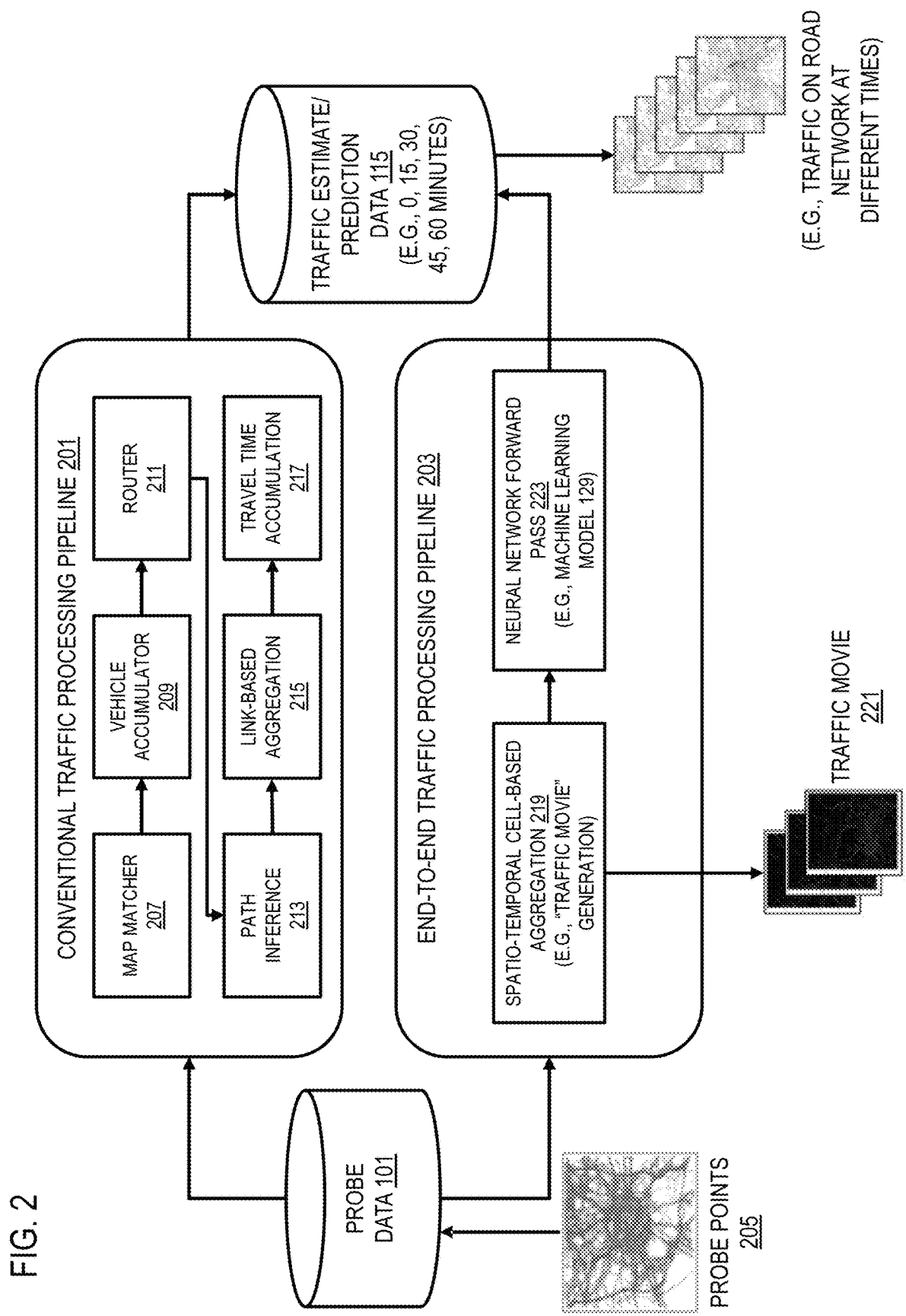
FIG. 2 is a diagram illustrating an example of traffic estimation based on anomaly detection, according to an example embodiment.

FIG. 2 is a diagram illustrating an example of traffic estimation based on anomaly detection, according to an example embodiment. In the example of FIG. 2, a conventional traffic processing pipeline 201 is compared with an example embodiment of an end-to-end traffic processing pipeline 203. Both pipelines 201 and 203 are performed in an online production scenario to process probe data 101 comprising probe points 205 collected over a period of time (e.g., the immediate last time epoch such as the last immediate 15 minutes, 30 minutes, etc.) to generate traffic estimate/prediction data 115. In this case, the traffic estimate/prediction data 115 represents the predicted traffic on a road network at different prediction times (e.g., current conditions at 0 minutes, or times in the future such as but not limited to 15 minutes, 30 minutes, 35 minutes, and 60 minutes into the future). In the conventional traffic processing pipeline, the pipeline 201 requires that the locations recorded in the probe data 101 be associated with the road segments in the road network of a geographic database 131 as each new set of probe data 101 is collected for processing.

The full conventional pipeline 201 historically has included computationally heavy processing to associate the probe data 101 to the road network. These steps include but are not limited to: (1) a map matcher 207 to translate the geocoordinates in the probe data 101 to corresponding road segments of the geographic database 131; (2) a vehicle accumulator 209 to identify unique vehicles 105 or other probe devices 103 in the probe data 101 and categorize the probe points 205 of the probe data 101 by the unique vehicles 105 or other probe devices 103; (3) a router 211 to correlate the probe points 205 to respective trajectories of each unique vehicle 105 or probe device 103; (4) a path inference 213 to determine a path comprising the road segments corresponding to the trajectories of the vehicles 105 or probe devices 103; (5) a link-based aggregation 215 that associates the vehicles 105 or probe devices 103 to respective road segments based on the links covered by their respective paths; and (6) a travel time accumulation 217 to determine the travel times of vehicles 105 or probe devices 103 associated with respective road segments from which the traffic estimate/prediction data 115 is generated. It is noted that this example of the convention processing pipeline 201 is provided by way of illustration and not as a limitation. It is contemplated that the conventional traffic processing pipeline 201 can include more or fewer number of processing steps.

In contrast to the conventional data processing pipeline 201, the embodiments of the end-to-end traffic processing pipeline 203 completely gets rid of the example conventional processing steps described above (e.g., step 207-217) and instead builds images or frames from probe data 101 directly by simple aggregations (e.g., spatio-temporal cell-based aggregations 219) that can be efficiently computed to generate "traffic movies" 221. For example, the spatio-temporal cell-based aggregations divide a geographic area covered by the probe data 101 into cells (e.g., a grid of cells of square or any other shape that provides coverage of the geographic area). Each cell effectively corresponds to a pixel of an image representing the geographic area. the spatio-temporal cell-based aggregation defines a time interval for each frame and then bins the probe data 101 into each frame based on the respective probe point 205 timestamp, and then bins the probe points 205 of each frame into respective cells of the frame based on the respective locations of the probe points 205. The aggregation 219 can be performed at different time intervals to create a multiple frames that form the traffic movie 221.

The one or more frames of the traffic movie 221 can then be processed using a neural network forward pass 223 (or equivalent machine learning model 129 mechanism). Neural networks or other machine learning models 129 are trained to approximate unknown functions which map from input to output data. In the various embodiments described herein, the entire pipeline of processing steps (e.g., the steps 207-217 of the conventional traffic processing pipeline 201) to derive average traffic speeds per road segment (e.g., traffic estimate/prediction data 115) from raw probe data 101 (as discussed previously) is interpreted as such a mapping function which can be approximated by a machine learning model 129 (e.g., a neural network). In one embodiment, the raw probe data 101 is only minimally preprocessed to a simple aggregate format (e.g., referred to as traffic movies 221), which is then input to the machine learning model 129 (e.g., neural network via a neural network forward pass 223). The network or machine learning model 129 itself is trained to learn a direct mapping from these input data (e.g., one or more frames of a traffic movie 221) to a vector (e.g., representing the traffic estimate/prediction data 115), where each value in the vector represents the traffic speed or other traffic parameter at a specific road segment at a particular prediction horizon (current time plus or minus n minutes, where n=0 for current traffic estimation, n>0 for future traffic prediction, and n<0 for past traffic prediction).

In one embodiment, the network or machine learning model 129 is trained offline (e.g., in a non-production or real-time environment), using historical probe data 101 as input and the outputs of a traditional probe data processing pipeline (e.g., such as the conventional traffic processing pipeline 201) which includes all or some combination of the processing steps 207-217 as mentioned before to label the historical probe data 101 for training. In the online production mode (e.g., predictive mode as opposed to training mode of the machine learning model 129), traffic estimations and predictions (e.g., traffic estimate/prediction data 115) can be provided much quicker and cheaper compared to traditional processing pipelines (e.g., conventional traffic processing pipeline 201 or equivalent) by applying the computationally cheap aggregation step (e.g., spatio-temporal cell-based aggregation 219) to the incoming probe data 101 (e.g., generating a traffic movie 221), and running a single forward pass 223 of the pretrained neural network without having to perform the steps of the conventional traffic processing pipeline 201 during online operation.

The trade-off between prediction quality and computational feasibility is solved by the fact that since the training process takes place offline, a more elaborate and computationally heavy probe processing pipeline (e.g., the conventional traffic processing pipeline 201) could be used for training data generation. The availability of higher quality training data would likely increase the quality of the network predictions in online production mode also, while having no effect on the computational effort, run time or memory consumption when running in production (online process) where, for instance, the conventional traffic processing pipeline 201 is replaced by the learned mapping of the trained machine learning model 129 that correlates the feature of the frames of a traffic movie 221 and a corresponding predicted traffic state of a geographic area of interest.

In one embodiment, apart from neural networks, other machine learning methods could also be used as the machine learning model 129 to map from such cheaply aggregated traffic movies 221 to traffic speeds on road segments (e.g., estimated or predicted traffic states). Thus, for instance, based on a database of historical data in the form of tuples of traffic movie and the corresponding traffic speeds (or any other traffic parameter) on road segments (as output by the traditional processing pipeline 201), algorithms could associate a current traffic movie with its most similar historical movie samples (e.g., k-nearest neighbors, clustering algorithms, or equivalent). Then, the traffic speeds on the road segments associated with the most similar neighbor could be retrieved and used as estimation/prediction result (e.g., traffic estimate/prediction data 115).

In one embodiment, the machine learning model 129 can be trained based on probe data 101 collected from a specific geographic area (e.g., a city) so that the model 129 can be used specifically for that geographic area or city. In addition or alternatively, there is the option of training a single model 129 on numerous areas of interest (e.g., different cities) by mixing training data from multiple regions, which would reduce costs for maintaining multiple models 129 and make the models 129 more generalizable to different geographic areas.

The various embodiments of end-to-end traffic estimation/prediction described herein provide for several technical advantages including but not limited to:

Computationally heavy processing of probe data 101 such as map matching, probe routing, etc. become obsolete in online production mode, resulting in lower costs and faster computation times, greater frequency of predictions, etc.

More elaborate algorithms can be used for processing the probe data 101 in offline training mode, avoiding, e.g., probe-point-to-road-segment-association errors introduced by simple point-based map matching algorithms.

Using a simple dispatching of incoming probe points by geographical region, the proposed system can be run in parallel to other systems (e.g., traditional traffic pipeline for rural areas, our proposed system for cities).

Computationally cheap aggregation and neural network forward pass in online production mode.

Estimation of current and prediction of future traffic conditions are generated with a single model and forward pass.

Possibility to train a single model to serve multiple cities.

Figure 3:
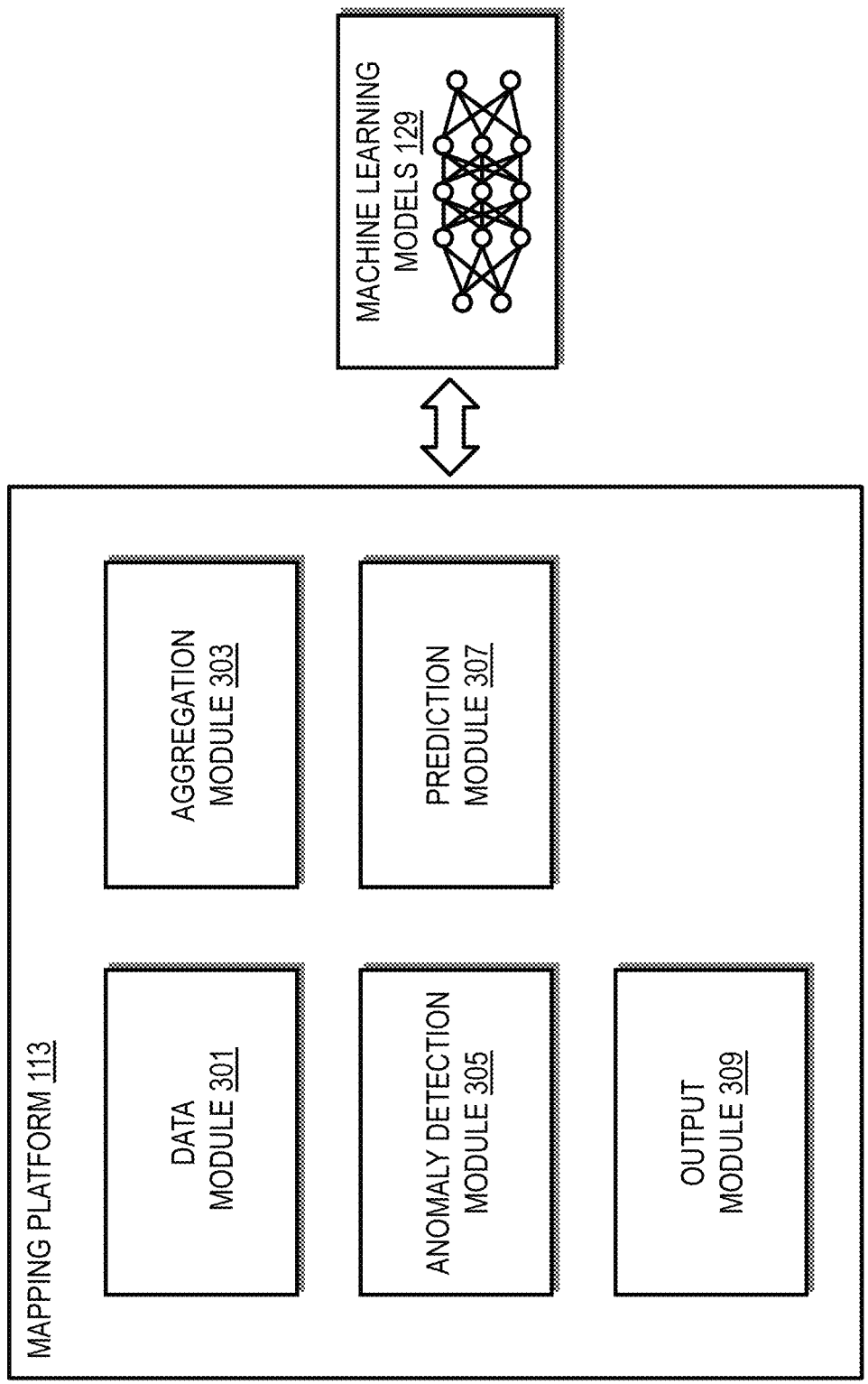
FIG. 3 is a diagram of components of a mapping platform capable of traffic estimation based on anomaly detection, according to an example embodiment.

FIG. 3 is a diagram of components of the mapping platform 113 capable of traffic estimation based on anomaly detection, according to an example embodiment. In one embodiment, as shown in FIG. 3, the mapping platform 113 includes one or more components for end-to-end traffic estimation/prediction with minimally processed input data according to the various embodiments described herein. It is contemplated that the functions of the components of the mapping platform 113 may be combined or performed by other components of equivalent functionality. As shown, in one embodiment, the mapping platform 113 includes a data module 301, an aggregation module 303, an anomaly detection module 305, a prediction module 307, and an output module 309 that interact with machine learning models 129 (e.g., Neural Networks or equivalent machine learning algorithm). The above presented modules and components of the mapping platform 113 can be implemented in hardware, firmware, software, or a combination thereof. Though depicted as a separate entity in FIG. 1, it is contemplated that the mapping platform 113 may be implemented as a module of any of the components of the system 100 (e.g., probe devices 103 (e.g., vehicles 105, UEs 107), services platform 119, services 121, content providers 123, and/or the like). In another embodiment, one or more of the modules 301-309 may be implemented as a cloud-based service, local service, native application, or combination thereof. The functions of the mapping platform 113 and modules 301-309 are discussed with respect to figures described below.

Figure 4:
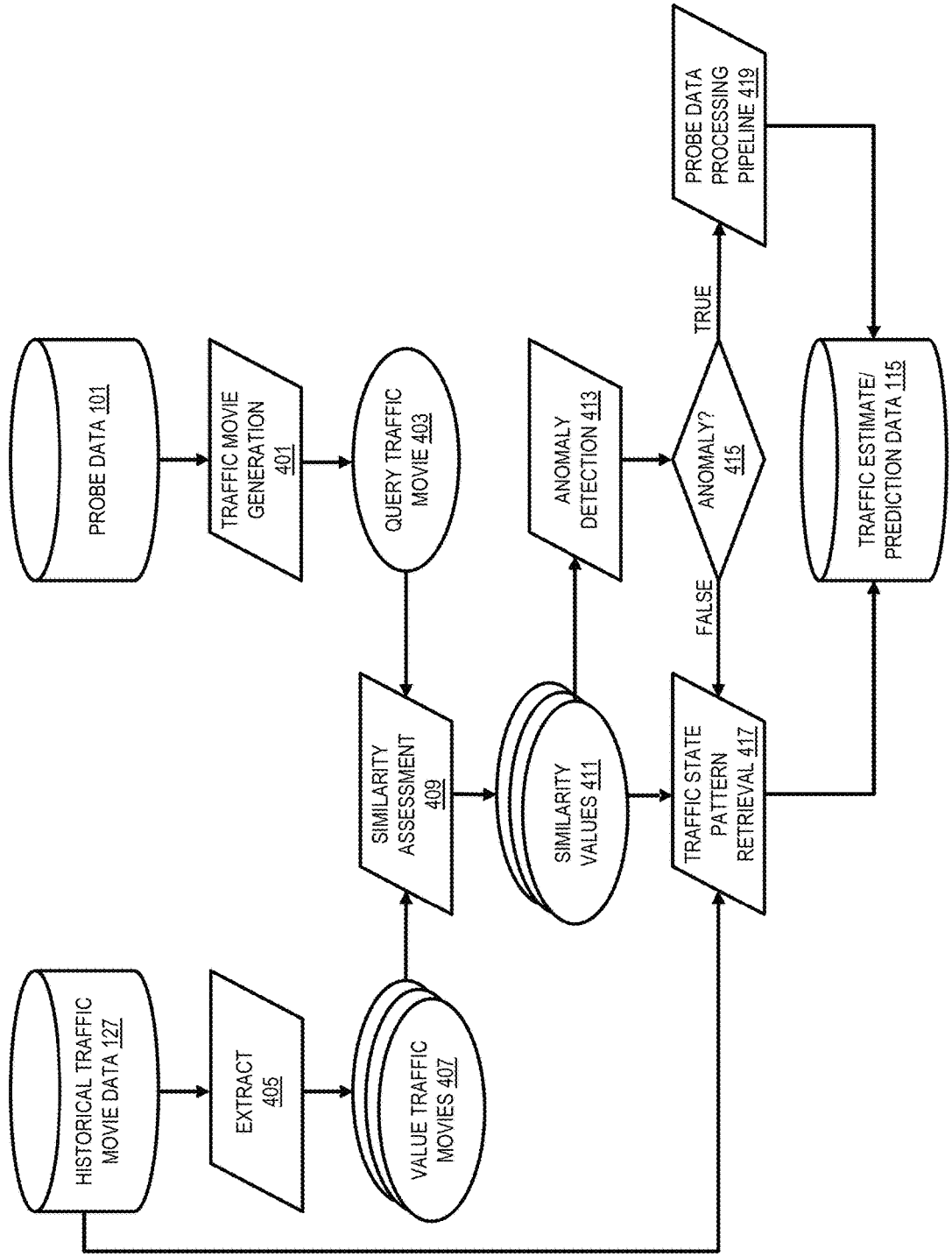
FIG. 4 is a flowchart of a process for traffic estimation based on anomaly detection, according to one embodiment.
Figure 12:
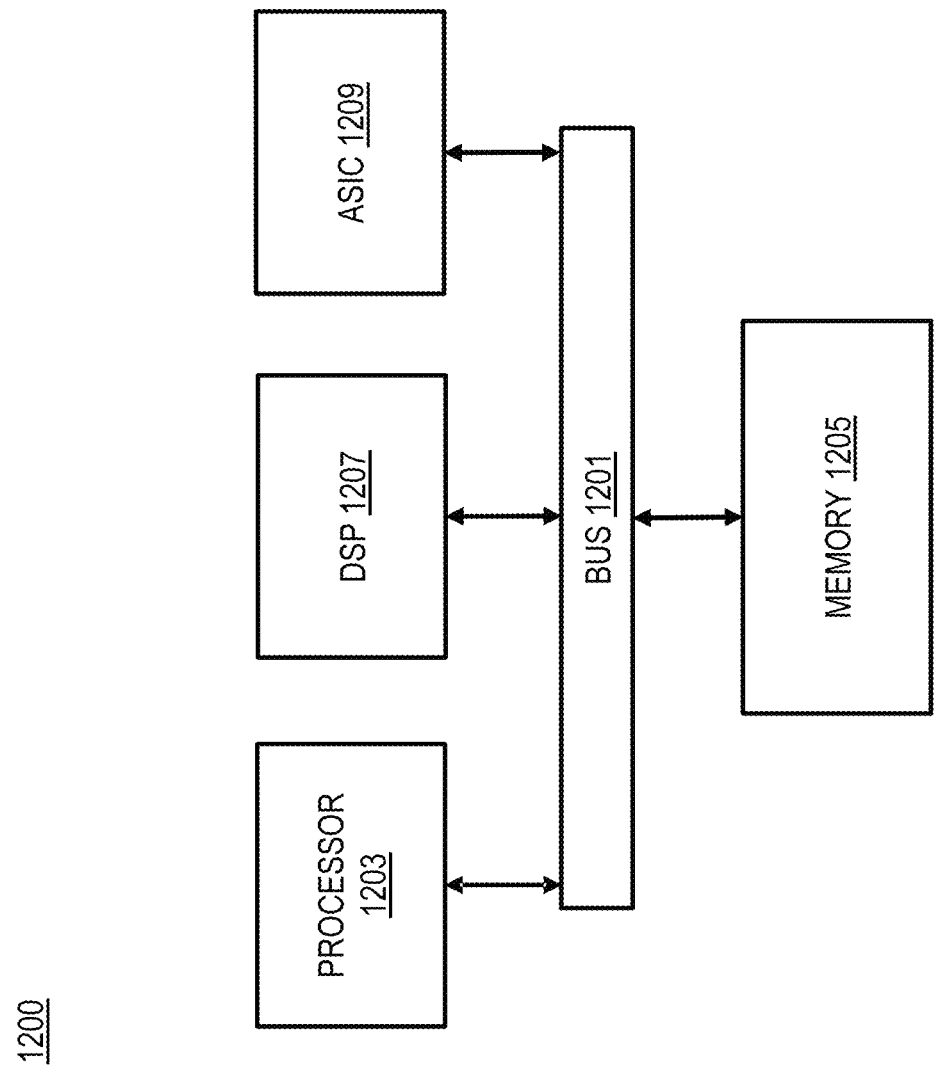
FIG. 12 is a diagram of a chip set that can be used to implement an example embodiment of the processes described herein.

FIG. 4 is a flowchart of a process 400 for traffic estimation based on anomaly detection, according to one embodiment. In various embodiments, the mapping platform 113 and/or any of the modules 301-309 may perform one or more portions of the process 400 and may be implemented in, for instance, a chip set including a processor and a memory as shown in FIG. 12. As such, the mapping platform 113 and/or any of the modules 301-309 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the data module 301 and aggregation module 303 interact to generate a traffic movie of the incoming probe data 101. As part of the traffic movie generation process, the data module 301 retrieves probe data 101 (e.g., historical probe data) collected from one or more sensors of one or more devices (e.g., probe devices 103 such as but not limited to vehicles 105 and UEs 107). The probe data 101 are raw probe points 205 (e.g., GPS probe points) collected from a time epoch of interest (e.g., immediate past 5 minutes, 10 minutes, 15 minutes, etc.) and geographic area of interest (e.g., a city, neighborhood, region, etc.) for which a traffic estimation and/or traffic anomaly detection is requested. By way of example, the probe data 101 includes one or more probe points respectively indicating a location, a speed, a heading, or a combination thereof of the one or more devices at a recorded time.

In one embodiment, the data used for traffic estimation does not have to be probe data 101, and instead can be any sensor data (e.g., environmental data) that is related to or can otherwise be correlated with traffic (e.g., road traffic). Examples of other sensor data that can be used in the various embodiments described herein include, but are not limited to, environment data, temperature data, precipitation data, light (visibility) data, data on percent use of EV charging stations, data on percent use of vehicle sharing options (e.g., scooter, bike, etc. sharing options). Accordingly, although the various embodiments described herein discuss traffic estimation with respect to probe data 101, it is contemplated that the embodiments are also applicable to any sensor data (such as loop detector sensed data, WiFi/Bluetooth sensed data, camera sensed data, etc.) that can be correlated to the traffic estimate/prediction data 115. Based on this, it is contemplated that the description of the embodiments that discuss only probe data 101 are equally applicable to any other type of sensor data alone or in combination with probe data 101.

In one embodiment, all probe points 205 of the probe data 101 within a certain area of interest (e.g., defined by a bounding box or other boundary marker) are extracted and aggregated. For example, the aggregation module 303 aggregates the probe data 101 or other sensor data into a sequence of one or more frames. Each frame of the sequence comprises, for instance, a plurality of spatial cells representing a geographic area at a respective time interval. The spatial cells, for instance, can represent any sub-area of the geographic area of interest. One example is a grid of cells (or any other shape that covers the geographic area of interest). Another example is a Voronoi diagram or equivalent. The cells can be of fixed sizes or can be vary dynamically. For example, in the dynamic use case, the size of each grid cell can vary with the density of the probe data 101 or other sensor data, the density of map features (e.g., road links), etc. in a given area. The respective time interval of each frame represents the time constraints for aggregating probe data 101 or other sensor into a corresponding frame. For example, a frame can represent a five minute period from 7:00 am to 7:05 am (or any other designated time interval). The time interval between each frame can be fixed. Alternatively, as with the spatial cell size, the time interval can also vary dynamically (e.g., based on data density, contextual factors such as time of day, day of the week, month, season, etc.). The probe data 101 or other sensor data is then spatially and temporally binned into the plurality of spatial cells.

FIGS. 5A and 5B are diagrams illustrating examples of encoding probe or sensor data into a sequence of frames (e.g., a traffic movie) for traffic estimation, according to an example embodiment. As shown in FIG. 5A, based on the bounding box (e.g., a geographic boundary 501) of a study area (e.g., a city or other geographic area), probe points 205 which are recorded within the study area are extracted from the stream of probe data 101. Then, the raw probe points 205 are aggregated in space and time. In one embodiment, for spatial aggregation, a simple grid 503 or other equivalent structure of a certain cell size (e.g., 100*100 meters) is placed on top of the study area, and all probe points 205 are allocated to their respective intersecting grid cell. In other words, the probe points 205 are spatially binned to their respective grid cells based on their geocoordinates falling within the geocoordinates associated with the respective grid cells (e.g., geocoordinates of the corner points or other designated boundary of the grid cells). In one embodiment, for temporal aggregation, time is discretized into intervals of a certain length (e.g., 5 minutes), and all probe points are allocated to a time bin based on the time when they were recorded. This spatial and temporal aggregation or binning results in the creation of a frame 507 that represents a plurality of spatial cells of the grid 503 at a respective time interval. A sequence comprising the frame 507 arranged in chronological order with one or more other frames can be referred to as a traffic movie. For example, for each time interval, a "frame" of the traffic movie or sequence of frames is generated with pixels corresponding to the spatial cells. This effectively converts the probe data 101 or other sensor data into image-like data that is amenable to processing by the machine learning model 129 (e.g., neural network).

In one embodiment, as shown in frames 521a and 521b (also collectively referred to as frames 521) of traffic movie 523 of FIG. 5B, different channels (e.g., channels 525a-525d—also collectively referred to as channels 525) holding aggregate statistics of the probe points falling in each cell of each frame 521 are computed. In one embodiment, statistics could include, e.g., the average speed and heading direction, or a simple count of probe points. In other words, in one embodiment, the aggregation module 303 computes an aggregate statistic for the probe data 101 binned in each spatial cell of the plurality of spatial cells (e.g., representing pixels in an image representation of the probe data 101 corresponding to each frame 521). In this way, the aggregation module 303 records the aggregate statistic in a channel 525 of said each spatial cell. It is contemplated that the various embodiments can use any number of channels depending on the types of aggregate statistics that are to be encoded into the training data. For example, the channels 525 of each frame 521 can also encode for different heading quadrants (e.g., N, E, W, S, NE, NW, SE, SW) in addition to probe point volume, average speed, etc. In one embodiment, multiple frames 521 comprising the traffic movie 523 (e.g., sequence of one or more frames 521) can be encoded in a tensor (or equivalent) of the form (t; h; w; c) where t=number of frames, h=height of the frame 521 (e.g., in number of cells), w=width of the frame 521 (e.g., in number of cells), and c=number of channels. The machine learning model 505, for instance, can then be further trained based on the aggregate statistic(s) encoded in the tensor, e.g., to learn the mapping between the statistics and traffic estimation/prediction output.

In one embodiment, the various embodiments of process of traffic movie generation described above can be performed both to produce a traffic movie of the probe data 101 to be classified as well as to produce the historical traffic movie data 127 against which the probe data 101 is to be compared. To produce the historical traffic movie data, for instance, the data module 301 retrieves historical probe data collected from one or more sensors of one or more devices previously traveling in a geographic area (e.g., an area corresponding to the geographic area of interest or at least including a portion of the area of interest of the observed probe data 101). As used herein, the term "historical" probe data refers to any probe data collected at a previous time that is different from a time the probe data 101 against which it is to be compared is or was collected.

The aggregation module 303 can then aggregate the historical probe data (e.g., different samples of the historical probe data) into one or more one or more historical sequences of one or more historical frames. As described in the traffic movie generation embodiments above, each historical frame of the one or more historical sequences comprises a plurality of spatial cells representing the geographic area at a respective time interval. The historical probe data is then spatially and temporally binned into the plurality of spatial cells. Optionally, aggregate statistics (e.g., minimum, maximum, mean, standard deviation, etc. of probe characteristics such as but not limited to speed, heading, count, etc.) can be generated for each cell of the historical traffic movie frames and stored in respective channels of the cells.

The aggregation module 303 can generate a linking of the one or more historical sequences to one or more respective historical traffic states. For example, any means of estimating the past, current, and/or future traffic states that is accepted as ground truth data can be used to process each historical frame. These means or processes for traffic estimation can include but are not limited to the conventional traffic processing pipeline 201 and/or the machine learning based end-to-end traffic processing pipeline 203 of FIG. 2 and discussed in more detail with respect to FIGS. 6-8 below. In one embodiment, the linking between the historical traffic frames and their respective traffic states can be a tuple of the one or more historical sequences and the one or more respective historical traffic states. The historical traffic states in each tuple, for instance, can include traffic estimates over a time period spanning a past period, current time, and/or future period. For example, traffic states for each historical frame or tuple can include past estimates (e.g., −60 minutes, −45 minutes, −30 minutes, −15 minutes, etc. from the present moment), a current estimate (e.g., 0 minutes), and/or future predictions (e.g., +15 minutes, +30 minutes, +45 minutes, +60 minutes, etc. from the present moment). In addition, it is contemplated that the historical traffic movies can include any number of frames, and that the aggregation module 303 can set a minimum and/or maximum number of frames for the traffic movies.

In one embodiment, the historical sequences (e.g., historical traffic movies) and their respective links to respective traffic states (e.g., historical traffic movie tuples) can be stored in a database (e.g., historical traffic movie data 127) for later querying and access. The historical traffic movie data 127, for instance, can store historical traffic movie sequences corresponding to unique traffic states encountered in past. By way of example, the historical sequences can be stored based on their similarity to other historical sequences or traffic states already stored in the historical movie data 127. For example, only historical sequences which differ by more than a similarity threshold to any other previously stored historical sequence can be stored. As another example, a certain number of each type of historical sequence (even if similar to an existing sequence) can be stored to provide a target number of examples of each different sequence or traffic state. In yet another example, examples over a certain age (e.g., more than 12 months) can expire and be replaced with newer examples. It is noted that the examples of storing historical sequences described above are provided by way of illustration and not as limitations.

In step 403, the traffic movie computed from the probe data 101 of interest in the previous step is used as a query to calculate the similarity against historical traffic movies stored in a database (e.g., historical traffic movie data 127). As discussed above, this database contains historical traffic movies which have been computed similarly as the current query traffic movie but at some point of time in the past. In one embodiment, the historical traffic movies or sequences are linked in a one-to-one relationship to respective historical traffic states per road segment (e.g., the speed and/or traffic volume).

In step 405, in response to the query, the aggregation module 303 can identify and extract the k-most similar traffic situations or states (e.g., value traffic movies 407) from the historical traffic movie data 127 using any similarity metric (e.g., 12 distance, a perceptual loss metric, and/or the like) calculated by comparing the traffic movie or sequence generated from the current probe data 101 of interest against the historical movies or sequences (e.g., similarity assessment 409). The value for k can be any desired number of candidate historical sequences that are to be returned as a set of query results (e.g., value traffic movies returned at step 407).

In one embodiment, in step 409, the comparison or similarity assessment can be performed using the original or encoded versions of the traffic movies. The encoded version can be generated by using, e.g., the encoder part of a pretrained Neural Network Autoencoder or equivalent. An autoencoder is a neural network trained to learned an efficient data encoding using an unsupervised process. The encoder is trained to eliminate noise, reduce data dimensionality, make sparse data denser, etc. while generating a representation that is as close to the original traffic movie as possible. The similarity between the traffic movie of the probe data 101 and the value traffic movies returned at step 407 can be computed based on respective encoded versions. In this way, traffic movies can be evaluated more efficiently (e.g., with reduced computational requirements, increased speed, etc.).

In other words, the aggregation module 303 computes a similarity of the sequence to one or more historical sequences comprising one or more historical frames of spatially and temporally binned historical probe data, and wherein the one or more historical sequences are linked with respective historical traffic states. In one embodiment, the output of the similarity assessment at step 409 are respective similarity values determined at step 411 for the respective value traffic movies returned at step 407 and extracted from the historical traffic movie data 127. In one embodiment, the number of similarity values determined at step 411 can be limited to the k-most highest values with k being user selectable. This enables the aggregation module 303 to select a predetermined number of the one or more historical sequences based on respective similarity values of the computed similarity to proceed with traffic anomaly classification described below.

In one embodiment, the similarity assessment at step 409 can be performed such that the similarity is computed based on a selected portion of the one or more frames of the probe data 101, the one or more historical frames of the historical traffic movie 127, or a combination thereof. The selected potion can be any subsection of the frame (e.g., a selected one or more grid cells of the frame). In other words, instead of comparing the entirety of the frame (e.g., which can represent a larger geographic such as a city), a smaller area of the frame (e.g., representing a neighborhood, block, etc.) can be selected for comparison. In this way, a traffic anomaly local to a selected portion or sub-area of the frame can be detected that might otherwise go undetected when evaluating a larger area.

In yet another embodiment, contextual attributes associated with the probe data 101 can be used to further refine the query of the historical traffic movie data 127. For example, the time of day, day of week, etc. associated with the probe data 101 can be used to select corresponding historical sequences in addition to or in place of image similarity.

Next, the resulting k similarity values determined at step 411 are then input to perform an anomaly detection at step 413. On this basis, the current traffic situation (as represented by the query traffic movie) can be classified as "normal" or an anomaly, using any preferred anomaly detection mechanism. In other words, the anomaly detection module 305 determines a classification of a traffic state associated with the probe data as either a normal traffic state or as a traffic anomaly based on the similarity (e.g., similarity values determined at step 411). For instance, the absolute difference of the maximum of the k similarity values determined at step 411 to an historical mean of all similarity values (e.g., values of either the extracted value traffic movies returned at step 407 or the entire database of the historical traffic movie data 127) can be calculated, and compared to a defined threshold (e.g., three standard deviations or any other specified threshold).

Thus, the aggregation module 303 computes an absolute difference between a maximum of the respective similarity values to a historical mean, and then compares the absolute difference to a threshold value to determine the classification of the traffic state as either the normal traffic state or the traffic anomaly. For example, traffic states or situations with similarity values 411 that are above the threshold or other evaluation criteria can be classified as a "normal" traffic state, while similarity values 411 that are equal to or below the threshold can be classified as a traffic anomaly. Alternatively, if a distance metric is used to determine traffic states that are closer in distance (e.g., within a distance threshold) are considered normal, while traffic states that are farther apart in distance (e.g., greater than a distance threshold apart) are considered traffic anomalies. A traffic anomaly indicates, for instance, that the current traffic situation (e.g., associated with the current probe data 101 of interest) is different beyond a threshold value (e.g., based on the similarity metric, distance metric, or equivalent) from all other historical traffic movies and corresponding states to which it is being compared. The output module 309 can provide the determined classification of either a normal traffic state or a traffic anomaly as an output (e.g., for further processing as indicated below, or as a direct output to a device indicating the classification).

In one embodiment, if the current traffic situation is considered "normal" at anomaly detection decision point performed at step 415, a traffic state pattern retrieval method performed at step 417 is triggered, where the traffic states per road segment corresponding to the k-most similar historical traffic movies (e.g., value traffic movies returned at step 407) are retrieved from the database (e.g., historical traffic movie data 127) and aggregated to a final estimation and prediction output (e.g., traffic estimate/prediction data 115). Here, any aggregation method can be used, e.g., taking the mean over all k label values. This aggregation method represents a computationally light process (e.g., relative to the conventional probe data processing pipeline 201) that can be performed more efficiently because it is based on retrieving traffic state from the historical traffic movie data 127 and manipulating the retrieved data through relatively simple operations (e.g., taking a mean). In summary, based on determining that the classification is a normal traffic state, the anomaly detection module 305 interacts with the prediction module 307 to compute the traffic state of the current sequence based on the respective historical states of the similar historical traffic movies.

However, if the current traffic situation is considered an anomaly at anomaly detection decision point of step 415, a more elaborate traffic estimation and prediction method taking real-time probe data into account is used. Therefore, a more advanced probe data processing pipeline performed at step 419 is triggered to produce the final output (e.g., the traffic estimate/prediction data 115). A more advanced probe data processing pipeline performed at step 419 refers to any other pipeline that is more computationally heavy than the traffic pattern retrieval process performed at step 417 described in the embodiments above for normal traffic states (e.g., traffic states matching historical patterns in the historical traffic movie data 127 within similarity thresholds). For example, the more advanced or elaborate data processing pipeline performed at step 419 can include but is not limited to the conventional traffic processing pipeline 201, end-to-end traffic processing pipeline 203, or equivalent.

Embodiments of the processes for training (offline) and using (online) the machine learning based end-to-end processing pipeline 203 is explained in more detail below with respect to FIGS. 6-8 below.

Figure 6:
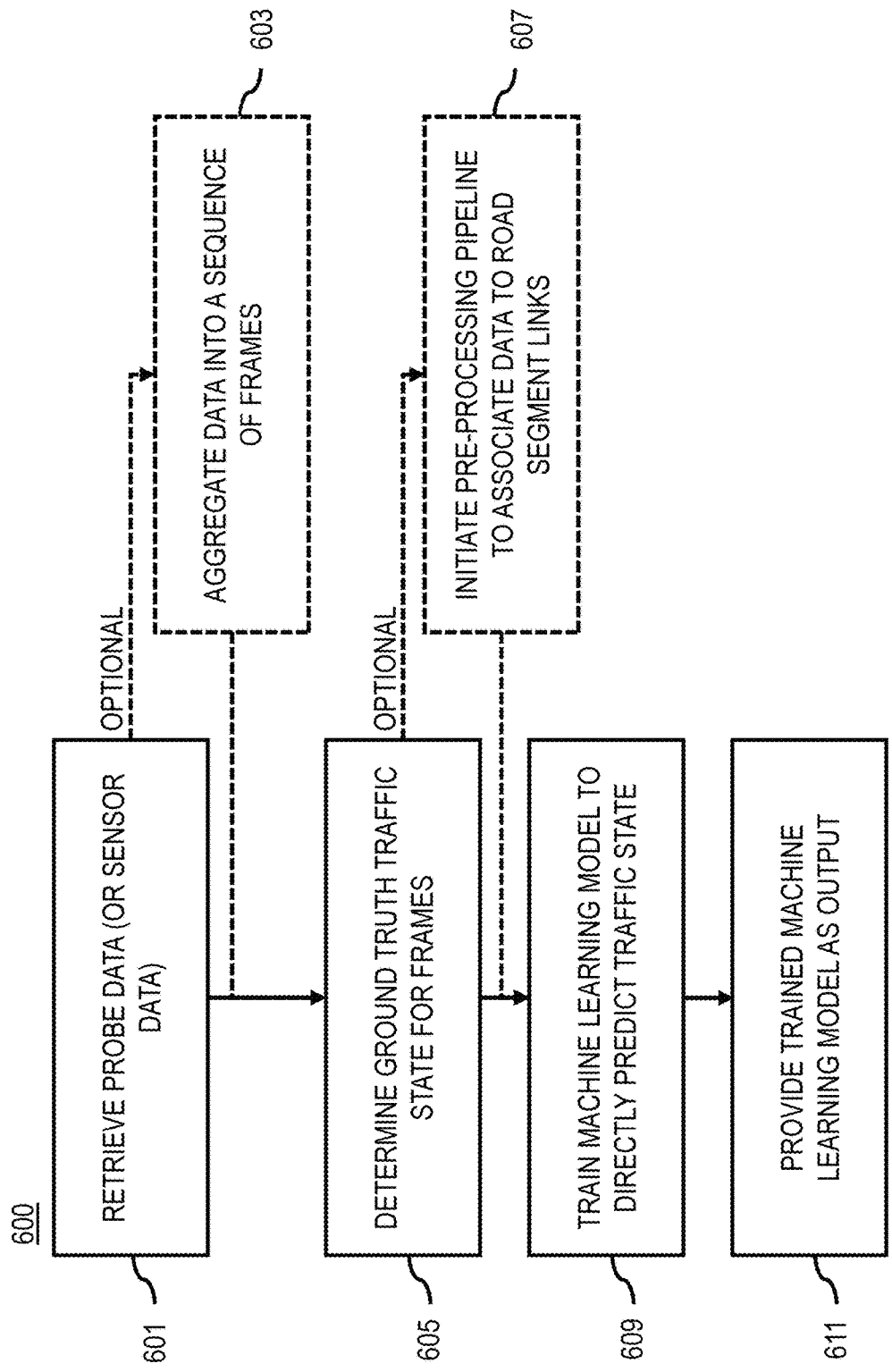
FIG. 6 is a flowchart of a process for training a machine learning model for end-to-end traffic estimation, according to an example embodiment.

FIG. 6 is a flowchart of a process 600 for training a machine learning model 129 for end-to-end traffic estimation, according to an example embodiment. In various embodiments, the mapping platform 113 and/or any of the modules 301-309 may perform one or more portions of the process 600 and may be implemented in, for instance, a chip set including a processor and a memory as shown in FIG. 12. As such, the mapping platform 113 and/or any of the modules 301-309 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In step 601, that data module 301 retrieves probe data 101 (e.g., historical probe data) collected from one or more sensors of one or more devices (e.g., probe devices 103 such as but not limited to vehicles 105 and UEs 107). The probe data 101 can be used to generate training data for training the machine learning model 129 for end-to-end traffic estimation/prediction according to the various embodiments described herein. By way of example, the probe data 101 includes one or more probe points respectively indicating a location, a speed, a heading, or a combination thereof of the one or more devices at a recorded time. If the machine learning model 129 is to be trained to predict traffic data for a specific geographic area (e.g., a city), the probe data 101 can be collected from the specific geographic area. As discussed above, to train the machine learning model 129 more generally, the probe data 101 can be collected from multiple geographic areas (e.g., multiple cities).

The probe data 101 retrieved in step 601 can then be used for training the machine learning model 129 for traffic prediction. It is contemplated that the probe data 101 can be used directly or otherwise aggregated to create training data. In one embodiment, the aggregation can include but is not limited to creating a probe movie (e.g., sequence of frames) from the probe data 101. For example, in step 603, the aggregation module 303 aggregates the probe data 101 or other sensor data into a sequence of one or more frames to generate a traffic movie as described in the embodiments of the process 400 of FIG. 4 above. In one embodiment, the various embodiments of process 400 of traffic movie generation described above can be performed both to produce the training data (using historical probe points) in an offline production mode for the end-to-end traffic processing pipeline 203 as described further below with respect to the remaining steps 605-611 below, and to produce input data for the pre-trained model running in an online production mode (using e.g., a cache of probe data received until 15 minutes prior to the current point in time) as described in more detail with respect FIG. 8 further below. As noted above, the process for traffic movie generation is provided by way of illustration and not as a limitation. It is contemplated that the probe data 101 and/or data derived from the probe data 101 (e.g., aggregate statistics) can be used as training data with aggregation or used after any other aggregation technique (e.g., subsampling, feature extraction, etc.).

In addition or alternatively to traffic movie generation, one example aggregation can include generating a vector of descriptive statics summarizing the probe data 101 in a geographic area. For example, the vector can be generated based on summary or descriptive statistics (e.g., minimum, maximum, mean, standard deviation, etc.) of the speed, probe count, heading, etc. indicated in the probe data 101 for a given region. In this way, the potential privacy issues associated with include raw probe data 101 (e.g., from which individual trajectories to or from privacy sensitive areas can be reconstructed) can be avoided by using such summary statistics.

Figure 7:
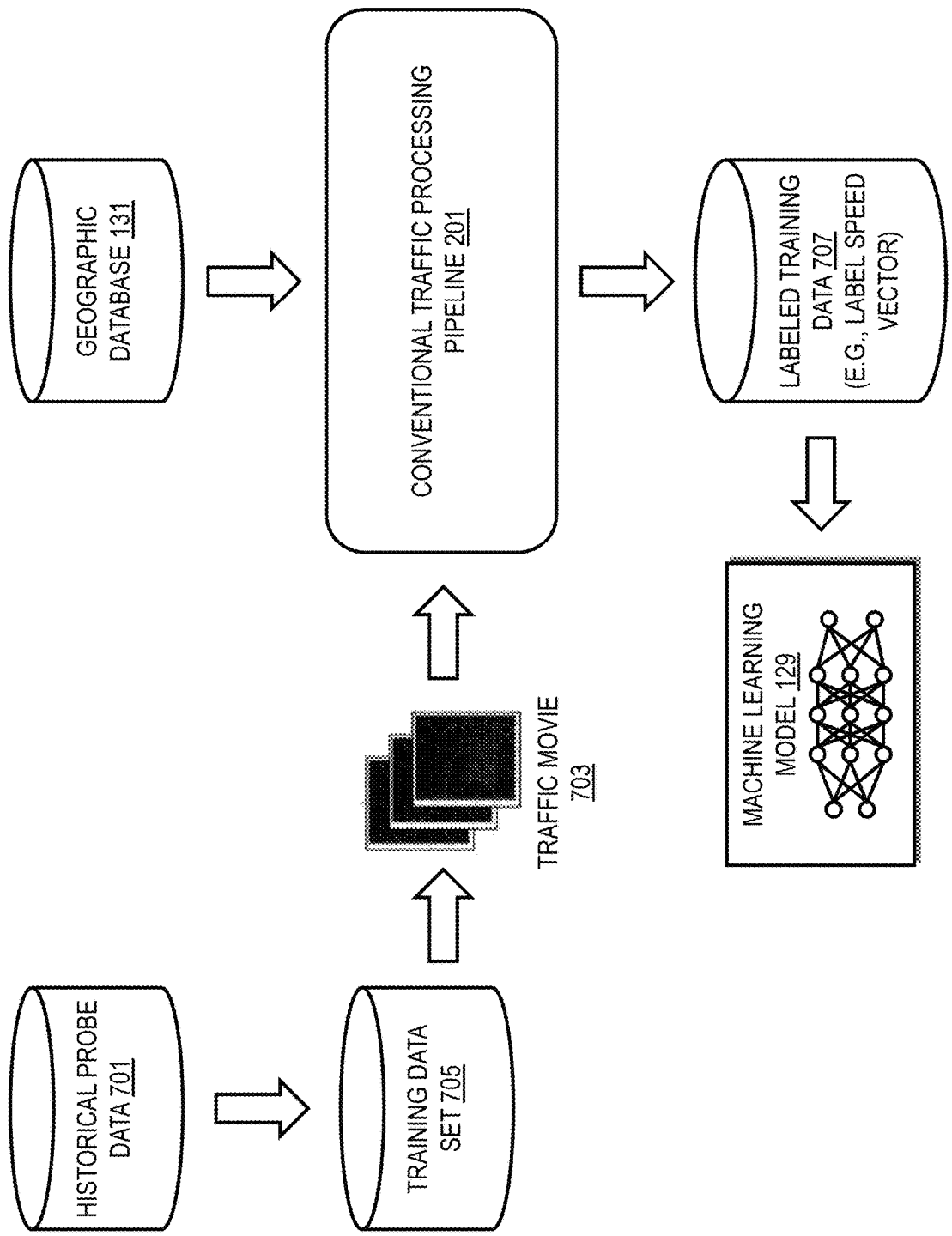
FIG. 7 is a diagram illustrating an offline training process to train a machine learning model for end-to-end traffic estimation, according to an example embodiment.

FIG. 7 is a diagram of illustrating an offline training process to train a machine learning model 129 for end-to-end traffic estimation, according to an example embodiment. As used herein, "offline" refers to building the end-to-end traffic estimation/prediction machine learning model 129 in a training mode in which no actual traffic estimate/prediction data 115 is generated. This training can be used to perform initial training of the machine learning model 129 or to update the training based on newly collected data. In one embodiment, the training enables the machine learning model 129 to learn a mapping or correlation between the probe data 101 (e.g., aggregated as input frames of spatially and temporally binned probe data 101 representing frames of a traffic movie) to traffic estimates or predictions on a road segment link basis (e.g., estimated average speed or other traffic parameter for individual road segments). As previously discussed, the road segments are digital map representations of a road network covering the geographic area of interest as stored in the geographic database 131 or equivalent database.

In step 605, the prediction module 307 determines a ground-truth traffic state for the probe data 101 (or frames of the probe data 101 if traffic movie aggregation is performed as described above). Determining the ground-truth can include but is not limited to receiving or generating ground-truth traffic state labels associated with the probe data 101 or movie frame. For example, the prediction module 307 can receive probe data 101 that has already been labeled or annotated (e.g., from content providers 123, services platform 119, or other ground-truth labeling/annotation pipeline). In one embodiment, the ground-truth traffic state labels can be obtained for one type of vehicle (e.g., four-wheeled vehicles such as but not limited to cars, trucks, etc.) and then applied for training the machine learning model 129 to predict traffic states for another type of vehicle (e.g., two-wheeled vehicles such as but not limited to motorcycles).

In addition or alternatively, the prediction module 307 can initiate a probe data processing pipeline (e.g., conventional traffic processing pipeline 201) to generate the labeled training data. For example, in one embodiment, based on historical probe data 701 (e.g., any collection of previously collected and stored probe data 101 or any other traffic-correlated sensor data), traffic movies 703 are generated for a training data set 705 of randomly picked (or selected by any other means) points in time (in the following referred to as "prediction times"), which will provide the training input data to the machine learning model 129 (e.g., a neural network). In other words, the aggregation module 303 determines one or more selected points in time (e.g., prediction times for training), and the aggregates the probe data (e.g., historical probe data 701) for the one or more selected points in time to train the machine learning model 129 or otherwise generate training data at the selected predictions times to train the machine learning model 129.

For each of these prediction times in the training data set 705, a label vector is generated, which comprises of the outputs of a conventional traffic processing pipeline 201. As described above, the traffic processing pipeline 201 can include any number of computationally heavy processing steps to associate the historical probe data 701 aggregated in the frames of the traffic movie 703 with corresponding road links and their ground-truth traffic data values (e.g., the average speeds for each road segment link as extracted from the geographic database 131 or other digital map data). In other words, as indicated in optional step 607, the prediction module 307 initiates a probe data pre-processing pipeline (e.g., conventional traffic processing pipeline 201 or equivalent) to associate the probe data (e.g., historical probe data 701 as included in the training data set 705 and aggregated into frames of the traffic movie 703) with one or more road segments of a geographic database 131 for said each frame of the traffic movie 703. In one embodiment, the probe-data pre-processing pipeline includes a map matcher, a vehicle accumulator, a router, a path inference, a travel time allocator, a link-based aggregation, a travel time accumulator, or a combination thereof. It is contemplated that any type of probe or sensor data pre-processing step regardless of computational requirements can be included as part of this data processing pipeline to generate a label vector for the training data set 705.

When applying step 605 in the context of generating traffic movies, the prediction module 307 determines a ground-truth traffic state for said each frame (e.g., at the selected prediction times of the training data set) based on the associated probe data (e.g., the historical probe data 701 that has been processed through the conventional traffic processing pipeline 201). In one embodiment, the ground-truth traffic state is the label vector output (e.g., label speed vector) that represents the corresponding traffic state (e.g., average speed or other traffic condition parameter per road segment link the geographic area of interest) generated by the conventional traffic processing pipeline 201. The labeled training data 707 comprise the label speed vectors generated at the predictions times picked for the training data set 705.

For example, in one embodiment, for each prediction time in the training data set 705, the speed values are extracted for prediction time+x minutes, where x=0 for estimating traffic at the current prediction time, x>0 for predicting future traffic conditions (e.g., $x \in \{15, 30, 45, 60\}$) and x<0 for predicting past traffic conditions. Thus, each value in the label vector represents the average traffic speed at a particular road segment at a particular point in time.

In step 609, the prediction module 307 trains the machine learning model 129 using the labeled training data 707 (e.g., comprising the ground-truth traffic state or label speed vector) to determine a predicted traffic state directly from one or more input frames without using the probe data pre-processing pipeline (e.g., conventional traffic processing pipeline 201, any combination of the steps of the conventional traffic processing pipeline 201, or other equivalent computationally heavy probe or sensor data pre-processing steps) to process the one or more input frames. In one embodiment of the training, the prediction module 307 can apply back propagation using any loss metric (e.g., a mean squared error) to train the machine learning model 129 (e.g., a neural network) to map from an input traffic movie directly to the current and future speeds on the road segment level.

In step 611, the output module 309 provides the trained machine learning model 129 as an output. In one embodiment, after the machine learning model 129 has been sufficiently trained and evaluated (e.g., trained to meet a target level of prediction accuracy), it can be deployed to a production system or environment. The production system can be a back-end server component (e.g., the mapping platform 113) to provide for end-to-end traffic estimation as a cloud component. In addition or alternatively, the trained machine learning model 129 can be deployed to edge devices (e.g., the probe devices 103, vehicles 105, UEs 107, and/or the like) to perform end-to-end traffic estimation locally at the devices.

In yet another embodiment, the output module 309 can deploy the trained machine learning model 129 as an embedding layer of another machine learning model. For example, the deployment can include extracting one or more hidden layers of the trained machine learning model 129 and adding those extracted layers to the other machine learning model. In another example, the deployment can include feeding one or more input frames (e.g., probe movies) to the pre-trained machine learning model 129 and store the activations of a particular hidden layer after the feeding. These activations contain highly abstract features describing the traffic state, and are privacy preserving. These activations could then be provided as input to a second machine learning model, instead of the original probe data 101 or probe movies, thereby preserving the privacy of the original probe data 101. In this way, the other machine learning model would gain the benefits of the learned mapping between probe data 101 as aggregated into one or more frames of a traffic movie and the traffic condition or state on road segments in the geographic area of interest. In addition, the deployment of the training machine learning model 129 as an embedding layer can also advantageously protect the privacy of the probe data 101 collected from the probe devices 103. This is because the raw probe data 101 is never exposed to the machine learning model receiving the embedding layer. This embedding layer abstracts the relationship of the feature of the probe data 101 as weights and coefficients of the neural network which does not contain any information for identifying individual probe devices 103.

Figure 8:
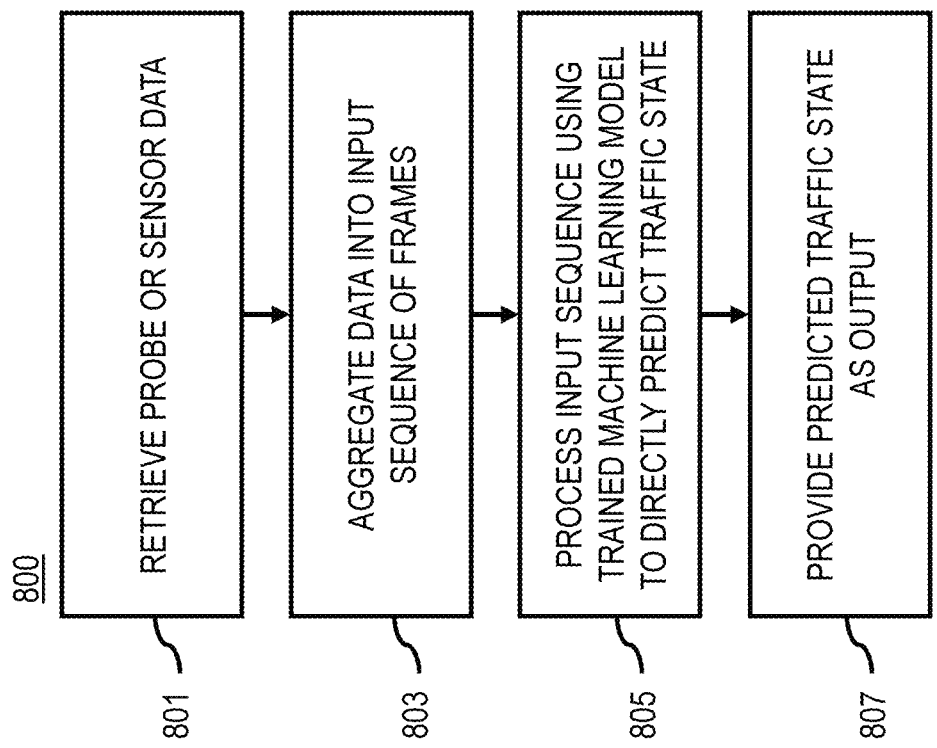
FIG. 8 is a flowchart of a process for using a trained machine learning model for end-to-end traffic estimation, according to one embodiment.

FIG. 8 is a flowchart of a process 800 for using a trained machine learning model for end-to-end traffic estimation, according to one embodiment. In various embodiments, the mapping platform 113 and/or any of the modules 301-309 may perform one or more portions of the process 800 and may be implemented in, for instance, a chip set including a processor and a memory as shown in FIG. 12. As such, the mapping platform 113 and/or any of the modules 301-309 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

After deployment, the training machine learning model 129 can be used in an online production environment. As used herein, the term "online" refers to operating the end-to-end traffic estimation machine learning model 129 on live data (e.g., probe or sensor data) to generate traffic estimate/prediction data 115 for requesting or customer applications and/or services. The process 800 assumes that the machine learning model 129 has been trained according to the embodiments of the process 600 of FIG. 6 or equivalent based on using a computationally heavy probe or sensor data processing pipeline (e.g., the conventional traffic processing pipeline 201) to generate labeled training data to train the machine learning model 129 for end-to-end traffic estimation.

In the embodiments of the process 800, incoming probe data is aggregated into traffic movies or any other type of aggregation form or method used for generating the training data on which the machine model 129 was trained, and passed to the pretrained neural network 125 without having to use the conventional traffic processing pipeline 201 or equivalent when operating in online prediction mode. In use cases where the machine learning model 129 accepts raw probe data 101 or data derived from the probe data 101 (e.g., aggregate statistics, network layer activations, etc.) as input, the process 800 need not perform the optional aggregation of the probe data 101 into traffic movies according to the embodiments described herein prior to passing the data to the pretrained neural network 129. Its predicted output vector (e.g., traffic estimate/prediction data 115) can then be translated to a format expected by the recipients of the traffic estimation/prediction service (e.g., customer systems 117, services platform 119, services 121, content providers 123, and/or the like).

Figure 9:
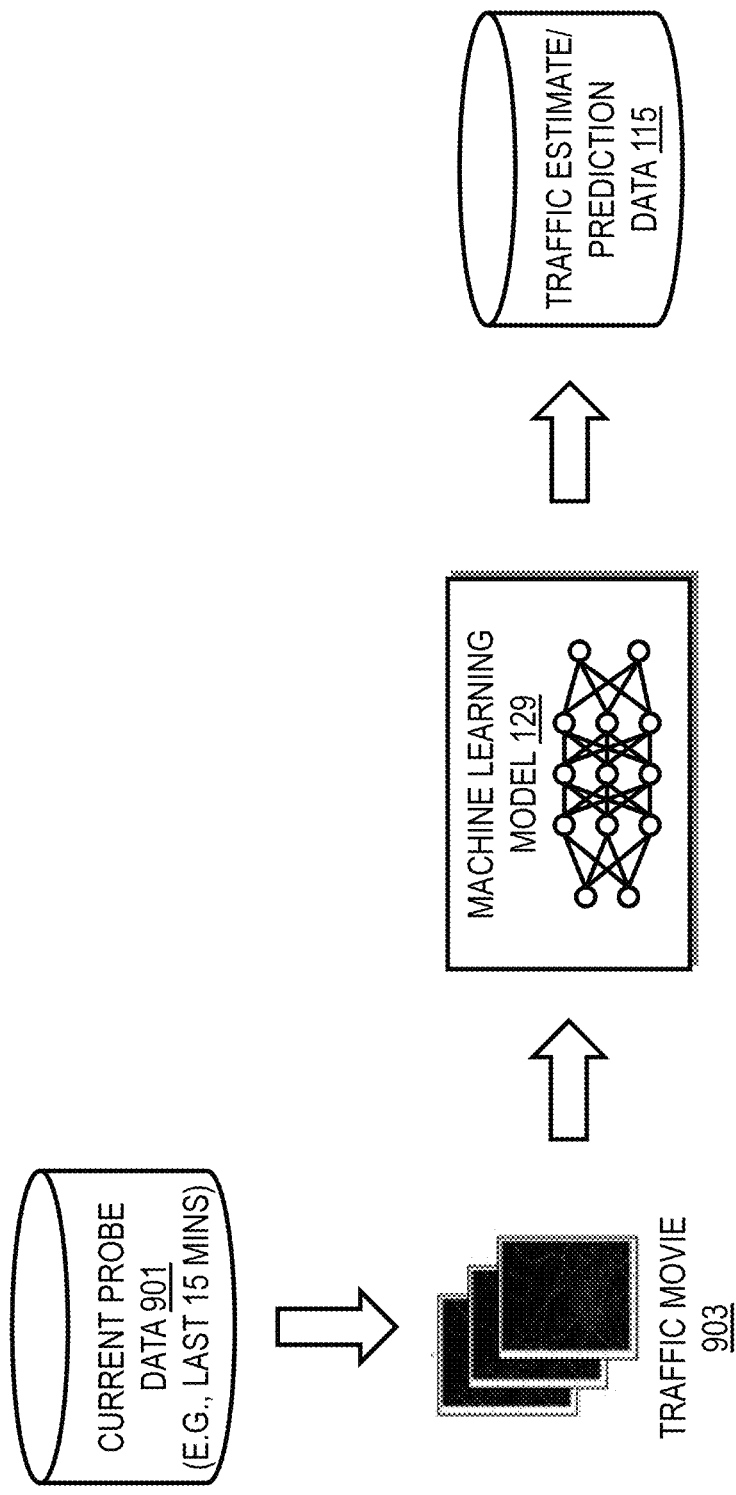
FIG. 9 is a diagram illustrating an online use of a machine learning model trained for end-to-end traffic estimation, according to an example embodiment.

In step 801, the data module 301 retrieves probe data 101 or other sensor data collected from one or more sensors of one or more devices traveling in a geographic area. For example, as shown in the example online system 901 of FIG. 9, the probe data 101 to be processed can include current probe data 901 which can include the probe data collected within the most recent designated time epoch (e.g., collected within the last 15 mins).

In step 803, the aggregation module 303 aggregates the probe data (e.g., current probe data 901) into an input sequence of one or more frames (e.g., frames of a traffic movie 903). The frames and the traffic movie can be generated as described with respect to the process 400 of FIG. 4. In this way, each frame of the sequence or traffic movie 903 comprises a plurality of spatial cells representing a geographic area at a respective time interval. The probe data (e.g., current probe data 901) can then be spatially and temporally binned into the plurality of spatial cells to populate the frames. This aggregation process to make the traffic movie 903 is computationally light compared to the heavy computational processes associated the conventional traffic processing pipeline 201.

In step 805, the prediction module 307 processes the input sequence (e.g., frames of the traffic movie 903) using a machine learning model (e.g., the machine learning model 129 trained according to the process 600 of FIG. 6) to directly determine a predicted traffic state (e.g., average speed per road segment link in a geographic area of interest) without using a pipeline for pre-processing probe data (e.g., the conventional traffic processing pipeline 201) on the input sequence. Instead, the machine learning model 129 was trained using training data (e.g., label speed vectors) generated based on applying the probe data pre-processing pipeline in an offline mode (e.g., the conventional traffic processing pipeline 201). This enables to system 100 to advantageously benefit from the prediction quality obtained from the conventional traffic processing pipeline 201 while avoiding use of the processing pipeline 201 during online operations when quick and lightweight processing are more critical.

In one embodiment, the input sequence can include a predetermined number of frames. The number of frames to be used in the input can be determined based on a balance of the prediction accuracy and prediction latency. For example, collecting probe data over a longer period to generate more frames can provide for better prediction because the trained machine learning model 129 can more accurately match the longer input sequences to corresponding predictions to improve accuracy. On the other hand, a fewer number of frames in the input sequence will enable to reduce input data collection time and provide for more immediate traffic estimations/predictions.

In step 807, the output module 307 provides the predicted traffic state (e.g., the traffic estimate/prediction data 115 as an output. As previously discussed, the output can be provided to requesting services and/or applications. In one example use case, the traffic estimate/prediction data 115 can be used to map displays, route generation based on traffic, and/or any other location-based services that rely on traffic data.

In yet another embodiment, the mapping platform 113 can perform the end-to-end traffic estimation/prediction to determine the predicted traffic state in parallel with performing another traffic prediction process (e.g., such as a process that uses the probe data pre-processing pipeline 201). In this way, the end-to-end traffic estimation with minimal processing of input data can be performed to quickly generate traffic estimate/prediction data 115 while performing a more computationally heavy process in an attempt to verify the quickly generated traffic estimate or prediction.

It is noted that the example use cases described above are provided by way of illustration and not as limitations. It is contemplated that the traffic estimate/prediction data 115 output from the system 100 can be used for any purpose, service, and/or application.

Returning to FIG. 1, as shown, the system 100 includes a mapping platform 113 for providing end-to-end traffic estimation with minimally processed input data. In one embodiment, the mapping platform 113 includes or is otherwise associated with one or more machine learning models 129 (e.g., neural networks or other equivalent network) for direct mapping between input features of probe data 101 which have been minimally processed into frames of a traffic movie to t a traffic state for road segments in a geographic area of interest. This direct prediction enables the mapping platform 113 to bypass the computationally heavy pre-processing processes of a conventional traffic processing pipeline 201.

In one embodiment, the mapping platform 113 has connectivity over the communication network 111 to the customer systems 117, services platform 119 that provides one or more services 121 that can use the traffic estimate/prediction data 115 to perform one or more functions. By way of example, the services 121 may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 121 uses the output of the mapping platform 113 (e.g., traffic estimate/prediction data 115) to provide services 121 such as navigation, mapping, other location-based services, etc. to the vehicles 105, UEs 107, and/or applications 109 executing on the UEs 107.

In one embodiment, the mapping platform 113 may be a platform with multiple interconnected components. The mapping platform 113 may include multiple servers, intelligent networking devices, computing devices, components, and corresponding software for combining location data sources according to the various embodiments described herein. In addition, it is noted that the mapping platform 113 may be a separate entity of the system 100, a part of the services platform 119, a part of one or more services 121, or included within components of the vehicles 105, UEs 107, and/or other probe devices 103.

In one embodiment, content providers 123 may provide content or data (e.g., including geographic data, etc.) to the geographic database 131, the mapping platform 113, the services platform 119, the services 121, the vehicles 105, the UEs 107, and/or the applications 109 executing on the UEs 107. The content provided may be any type of content, such as machine learning models, map embeddings, map content, textual content, audio content, video content, image content, etc. In one embodiment, the content providers 123 may provide content that may aid in compressing data according to the various embodiments described herein. In one embodiment, the content providers 123 may also store content associated with the mapping platform 113, geographic database 131, services platform 119, services 121, and/or any other component of the system 100. In another embodiment, the content providers 123 may manage access to a central repository of data, and offer a consistent, standard interface to data, such as a repository of the geographic database 131.

In one embodiment, the vehicles 105 and/or UEs 107 may execute software applications 109 to use traffic estimate/prediction data 115 (e.g., for mapping, navigation, autonomous operation, etc.) according to the embodiments described herein. By way of example, the applications 109 may also be any type of application that is executable on the vehicles 105 and/or UEs 107, such as autonomous driving applications, mapping applications, location-based service applications, navigation applications, device control applications, content provisioning services, camera/imaging application, media player applications, social networking applications, calendar applications, and the like. In one embodiment, the applications 109 may act as a client for the mapping platform 113 and perform one or more functions associated with compressing data for machine learning or equivalent tasks alone or in combination with the mapping platform 113.

By way of example, the vehicles 105 and/or UEs 107 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 105 and/or UEs 107 can support any type of interface to the user (such as "wearable" circuitry, etc.). In one embodiment, the vehicles 105 and/or UEs 107 may be associated with or be a component of a vehicle or any other device.

In one embodiment, the vehicles 105 and/or UEs 107 are configured with various sensors for generating or collecting environmental image data, related geographic data, etc. In one embodiment, the sensed data represent sensor data associated with a geographic location or coordinates at which the sensor data was collected, and the polyline or polygonal representations of detected objects of interest derived therefrom to generate the digital map data of the geographic database 131. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicles 105 and/or UEs 107 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the vehicles 105 and/or UEs 107 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the vehicles 105 and/or UEs 107 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 113, services platform 119, services 121, vehicles 105 and/or UEs 107, and/or content providers 123 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
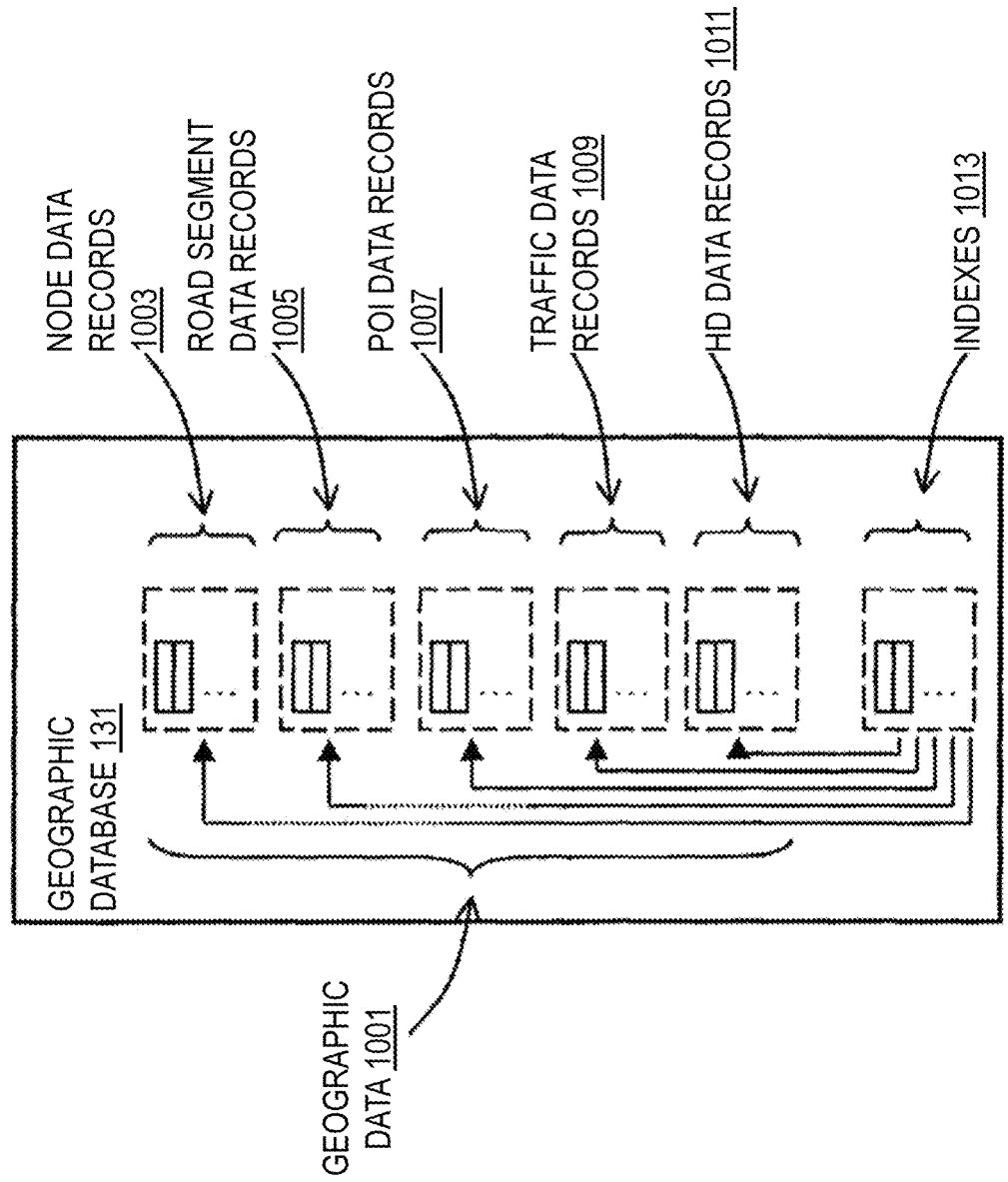
FIG. 10 is a diagram of a geographic database, according to an example embodiment.

FIG. 10 is a diagram of a geographic database 131, according to one embodiment. In one embodiment, the geographic database 131 includes geographic data 1001 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 1001. In one embodiment, the geographic database 131 include high definition (HD) mapping data that provide centimeter-level or better accuracy of map features. For example, the geographic database 131 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 131.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 131 follows certain conventions. For example, links do not cross themselves and do not cross each other except at a node. Also, there are no duplicated shape points, nodes, or links. Two links that connect each other have a common node. In the geographic database 131, overlapping geographic features are represented by overlapping polygons. When polygons overlap, the boundary of one polygon crosses the boundary of the other polygon. In the geographic database 131, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 131 includes node data records 1003, road segment or link data records 1005, POI data records 1007, traffic data records 1009, HD mapping data records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 131. In one embodiment, the indexes 1013 may be used to quickly locate data without having to search every row in the geographic database 131 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (for example, representing intersections or an end of a road) corresponding to the respective links or segments of the road segment data records 1005. The road link data records 1005 and the node data records 1003 represent a road network, such as used by vehicles, cars, and/or other entities. Alternatively, the geographic database 131 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 131 can include data about the POIs and their respective locations in the POI data records 1007. The geographic database 131 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 131 can also include traffic data records 1009 for storing traffic estimate/prediction data 115, machine learning models 129 (e.g., trained and untrained), embedding layers extracted from trained machine learning models 129, detected current traffic movies, historical traffic movies, traffic anomalies, and/or any other related data that is used or generated according to the embodiments described herein. By way of example, the traffic data records 1009 can be associated with one or more of the node records 1003, road segment records 1005, and/or POI data records 1007 to associate the traffic data 1009 with specific places, POIs, geographic areas, and/or other map features. In this way, the compressed data records 1009 can also be associated with the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1011 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 131 can be maintained by the content provider 123 in association with the services platform 119 (e.g., a map developer). The map developer can collect geographic data to generate and enhance the geographic database 131. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 131 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicles 105 and/or UEs 107. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing traffic estimation based on anomaly detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
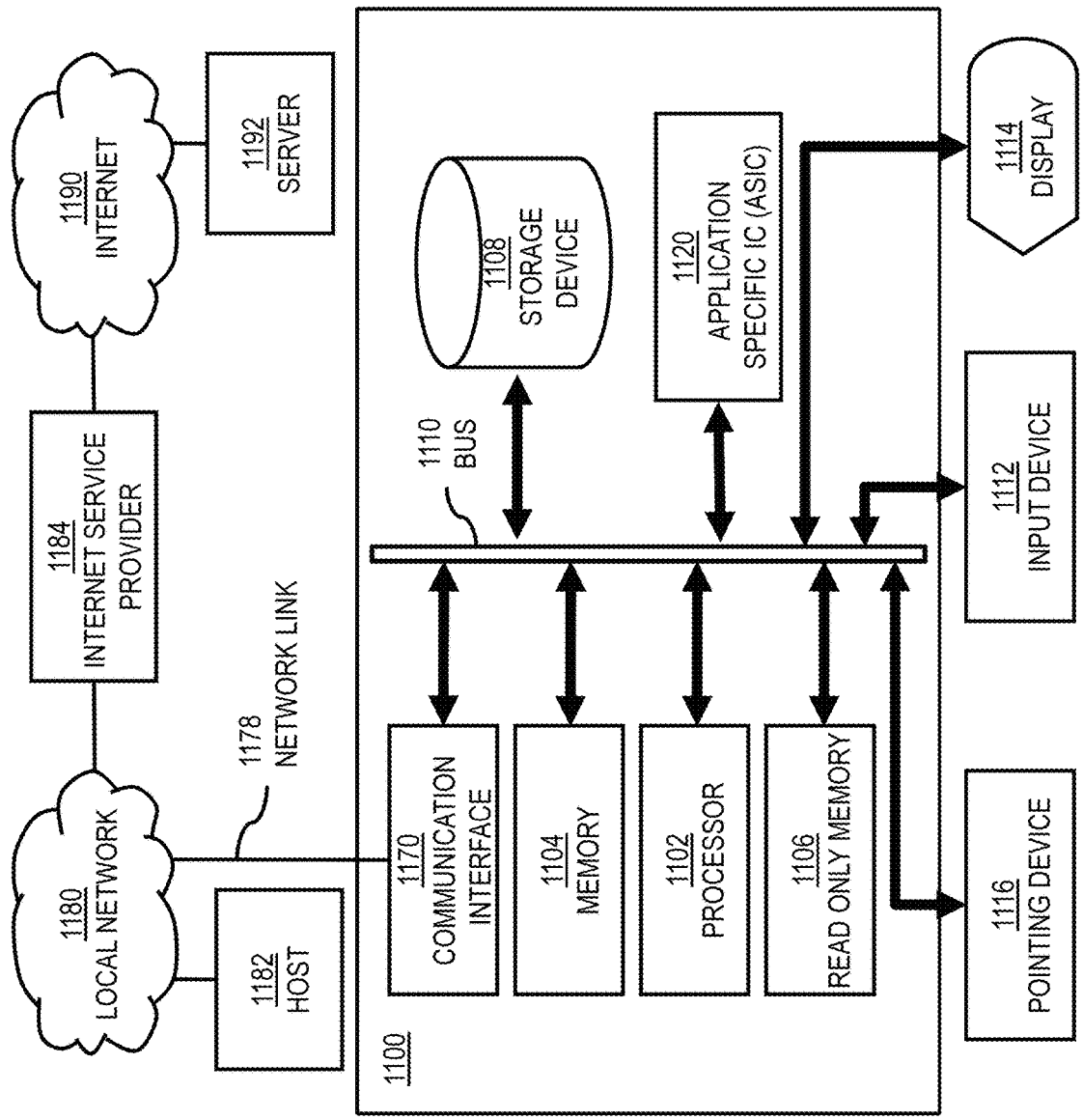
FIG. 11 is a diagram of hardware that can be used to implement an example embodiment of the processes described herein.

FIG. 11 illustrates a computer system 1100 upon which an embodiment of the invention may be implemented. Computer system 1100 is programmed (e.g., via computer program code or instructions) to provide traffic estimation based on anomaly detection as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit).

Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing traffic estimation based on anomaly detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing traffic estimation based on anomaly detection. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing traffic estimation based on anomaly detection, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 111 for providing traffic estimation based on anomaly detection.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide traffic estimation based on anomaly detection as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide traffic estimation based on anomaly detection. The memory 1205 also stores the data associated with or generated by the execution of the inventive steps.

Figure 13:
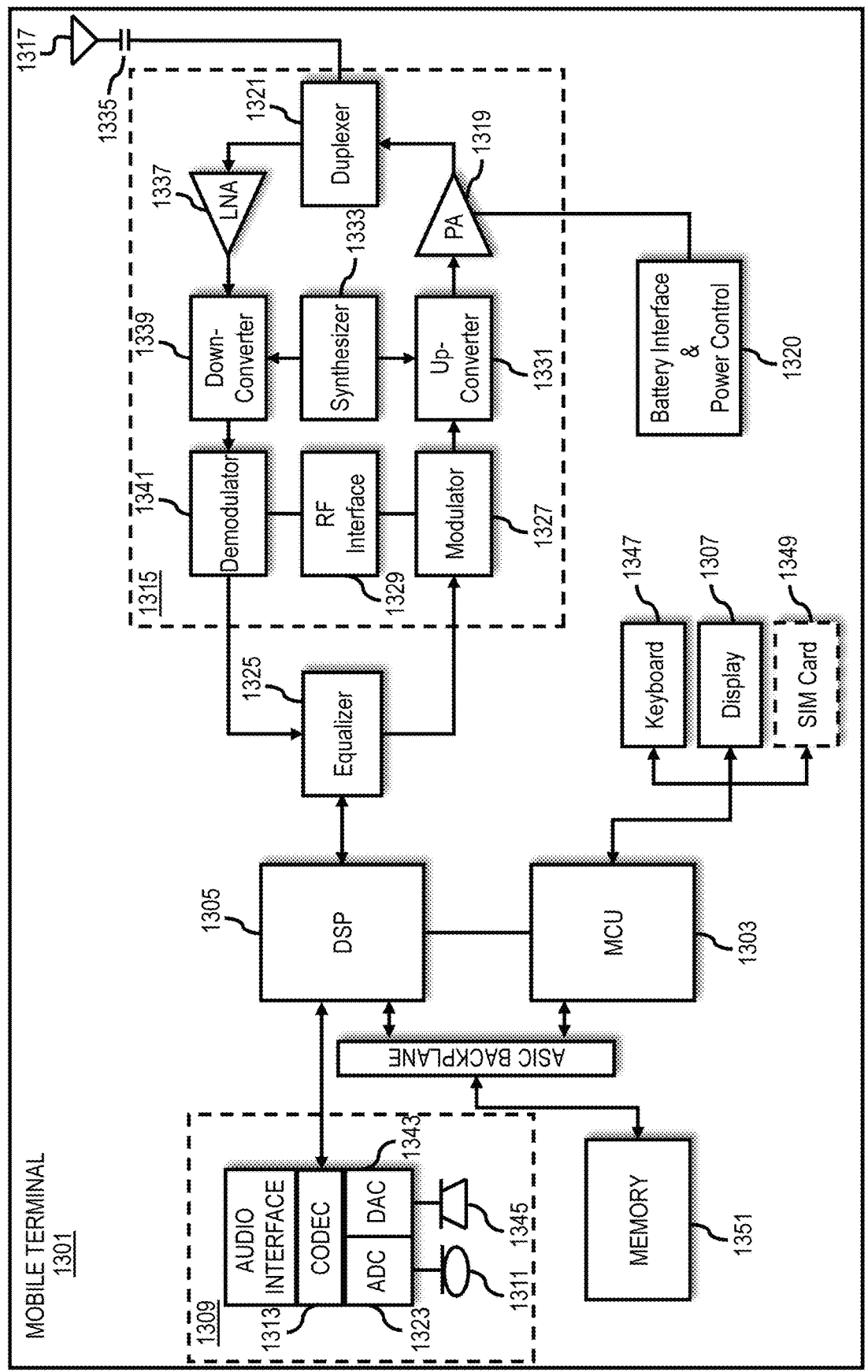
FIG. 13 is a diagram of a terminal that can be used to implement an example embodiment of the processes described herein.

FIG. 13 is a diagram of exemplary components of a mobile terminal 1301 (e.g., a probe device 103, vehicle 105, and/or UE 107 or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (TMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to providing traffic estimation based on anomaly detection. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
retrieving probe data collected from one or more sensors of one or more devices traveling in a geographic area;
aggregating the probe data into a sequence of one or more frames, wherein each frame of the sequence comprises a plurality of spatial cells representing the geographic area at a respective time interval, and wherein the probe data is spatially and temporally binned into the plurality of spatial cells, wherein the probe data is spatially binned to a respective cell of the spatial cells based on geocoordinates of the probe data falling within geocoordinates corresponding to a designated boundary of the respective cell;
converting the sequence of one or more frames into a traffic movie;
computing a similarity of the sequence of the traffic movie to one or more historical sequences of one or more historical traffic movies comprising one or more historical frames of spatially and temporally binned historical probe data, and wherein the one or more historical sequences are linked with respective historical traffic states;
determining a classification of a traffic state associated with the probe data as either a normal traffic state or as a traffic anomaly based on the similarity; and
providing the classification of the traffic state as an output.

2. The method of claim 1, further comprising:
based on determining that the classification is the normal traffic state, computing the traffic state of the sequence based on the respective historical states.

3. The method of claim 1, further comprising:
based on determining that the classification is the traffic anomaly, processing the probe data using a data processing pipeline to compute the traffic state of the sequence.

4. The method of claim 1, further comprising:
selecting a predetermined number of the one or more historical sequences based on respective similarity values of the computed similarity, wherein the classification of the traffic state is based on the respective similarity values of the predetermined number of the one or more historical sequences.

5. The method of claim 4, further comprising:
computing an absolute difference between a maximum of the respective similarity values to a historical mean; and
comparing the absolute difference to a threshold value to determine the classification of the traffic state as either the normal traffic state or the traffic anomaly.

6. The method of claim 1, wherein the one or more historical sequences are linked one-to-one with the respective historical traffic states as respective tuples.

7. The method of claim 1, further comprising:
querying the one or more historical sequences from a database based on the sequence.

8. The method of claim 1, wherein the similarity is computed based on respective encoded versions of the sequence and the one or more historical sequences.

9. The method of claim 8, wherein the respective encoded versions are generated using a pretrained machine learning autoencoder.

10. The method of claim 1, wherein the similarity is computed based on a selected portion of the one or more frames, the one or more historical frames, or a combination thereof.

11. An apparatus comprising:
at least one processor; and
at least one memory including computer program code for one or more programs,
the at least one memory and the computer program code configured to, within the at least one processor, cause the apparatus to perform at least the following,
retrieve historical probe data collected from one or more sensors of one or more devices previously traveling in a geographic area;
aggregate the historical probe data into one or more historical sequences of one or more historical frames, wherein each historical frame of the one or more historical sequences comprises a plurality of spatial cells representing the geographic area at a respective time interval, and wherein the historical probe data is spatially and temporally binned into the plurality of spatial cells, wherein the probe data is spatially binned to a respective cell of the spatial cells based on geocoordinates of the probe data falling within geocoordinates corresponding to a designated boundary of the respective cell;
convert the one or more historical sequences of the one or more historical frames into one or more traffic movies;
generate a linking of the one or more historical sequences of the one or more traffic movies to one or more respective historical traffic states;
store the association in a database,
wherein the database enables determining a traffic state classification of an observed sequence of one or more other frames aggregated from other probe data.

12. The apparatus of claim 11, wherein the linking is a tuple of the one or more historical sequences and the one or more respective historical traffic states.

13. The apparatus of claim 11, wherein the apparatus is further caused to:
provide the one or more historical sequences in response to a query of the database, wherein the query is based on the observed sequence.

14. The apparatus of claim 11, wherein the traffic state classification is based on a similarity assessment between the one or more historical sequences and the observed sequence.

15. The apparatus of claim 11, wherein the classification includes a normal traffic state, a traffic anomaly, or a combination thereof.

16. A non-transitory computer-readable storage medium carrying one or more sequences of one or more instructions which, when executed by one or more processors, cause an apparatus to perform:
retrieving sensor data collected from one or more sensors of one or more devices traveling in a geographic area;
aggregating the sensor data into a sequence of one or more frames, wherein each frame of the sequence comprises a plurality of spatial cells representing the geographic area at a respective time interval, and wherein the probe data is spatially and temporally binned into the plurality of spatial cells, wherein the probe data is spatially binned to a respective cell of the spatial cells based on geocoordinates of the probe data falling within geocoordinates corresponding to a designated boundary of the respective cell;
converting the sequence of one or more frames into a traffic movie;
computing a similarity of the sequence of the traffic movie to one or more historical sequences of one or more historical traffic movies comprising one or more historical frames of spatially and temporally binned historical sensor data, and wherein the one or more historical sequences are linked with respective historical traffic states;
determining a classification of a traffic state associated with the probe data based on the similarity; and
providing the classification of the traffic state as an output.

17. The non-transitory computer-readable storage medium of claim 16, wherein the apparatus is caused to further perform:
based on determining that the classification is a normal traffic state, computing the traffic state for the sequence based on the respective historical states.

18. The non-transitory computer-readable storage medium of claim 16, wherein the apparatus is caused to further perform:
based on determining that the classification is a traffic anomaly, processing the sensor data using a data processing pipeline to compute the traffic state of the sequence.

19. The non-transitory computer-readable storage medium of claim 16, wherein the apparatus is caused to further perform:
selecting a predetermined number of the one or more historical sequences based on respective similarity values of the computed similarity,
wherein the classification of the traffic state is based on the respective similarity values of the predetermined number of the one or more historical sequences.

20. The non-transitory computer-readable storage medium of claim 19, wherein the apparatus is caused to further perform:
computing an absolute difference between a maximum of the respective similarity values to a historical mean; and
comparing the absolute difference to a threshold value to determine the classification of the traffic state as either the normal traffic state or the traffic anomaly.

* * * * *